United States Patent
Sharp et al.

(10) Patent No.: US 6,704,065 B1
(45) Date of Patent: Mar. 9, 2004

(54) OPTICAL SYSTEM FOR PRODUCING A MODULATED COLOR IMAGE

(75) Inventors: Gary D. Sharp, Boulder, CO (US); Michael G. Robinson, Boulder, CO (US); Jonathan R. Birge, Boulder, CO (US)

(73) Assignee: Colorlink, Inc., Boulder, CO (US)

( * ) Notice: Subject to any disclaimer, the term of this patent is extended or adjusted under 35 U.S.C. 154(b) by 0 days.

(21) Appl. No.: 09/570,548

(22) Filed: May 12, 2000

Related U.S. Application Data

(63) Continuation-in-part of application No. 09/241,400, filed on Feb. 2, 1999, now Pat. No. 6,452,646, which is a continuation of application No. 08/853,461, filed on May 9, 1997, now Pat. No. 5,999,240, which is a continuation-in-part of application No. 08/447,522, filed on May 23, 1995, now Pat. No. 5,751,384, and a continuation-in-part of application No. 08/645,580, filed on May 14, 1996, now Pat. No. 5,822,021, application No. 09/570,548, which is a continuation-in-part of application No. 09/466,053, filed on Dec. 17, 1999, now Pat. No. 6,380,997, which is a continuation-in-part of application No. 09/215,208, filed on Dec. 18, 1998, now Pat. No. 6,078,374, which is a continuation-in-part of application No. 08/901,837, filed on Jul. 28, 1997, now Pat. No. 6,046,786, which is a continuation of application No. 08/419,593, filed on Apr. 7, 1995, now Pat. No. 5,658,490.

(60) Provisional application No. 60/134,535, filed on May 17, 1999, provisional application No. 60/134,223, filed on May 14, 1999, provisional application No. 60/121,494, filed on Feb. 24, 1999, and provisional application No. 60/113,005, filed on Dec. 18, 1998.

(51) Int. Cl.[7] ............................................. G02F 1/1335
(52) U.S. Cl. .......................................... 349/5; 359/497
(58) Field of Search ............................ 349/5, 8, 9, 18; 359/497, 639, 640; 353/31; 385/16

(56) References Cited

U.S. PATENT DOCUMENTS

| | | | |
|---|---|---|---|
| 4,464,018 A | * 8/1984 | Gagnon | 348/751 |
| 4,744,075 A | * 5/1988 | Buhrer | 398/79 |
| 4,786,146 A | * 11/1988 | Ledebuhr | 348/742 |
| 4,824,214 A | * 4/1989 | Ledebuhr | 349/9 |
| 4,987,567 A | * 1/1991 | Buhrer | 398/79 |
| 4,988,170 A | * 1/1991 | Buhrer | 359/497 |
| 5,105,265 A | * 4/1992 | Sato et al. | 348/656 |
| 5,157,523 A | * 10/1992 | Yamagishi et al. | 349/119 |
| 5,231,521 A | * 7/1993 | Johnson et al. | 349/18 |
| 5,239,322 A | * 8/1993 | Takanashi et al. | 349/9 |
| 5,575,548 A | * 11/1996 | Lee | 353/31 |
| 5,642,214 A | * 6/1997 | Ishii et al. | 349/96 |
| 5,706,603 A | * 1/1998 | Bergquist et al. | 47/DIG. 1 |
| 5,973,759 A | * 10/1999 | Itoh et al. | 349/121 |

* cited by examiner

Primary Examiner—Kenneth Parker
(74) Attorney, Agent, or Firm—Fleshner & Kim, LLP

(57) ABSTRACT

An optical system divides a light source into its component color bands red, green and blue by making the light travel different physical paths, at least two of these paths use stack retardation films and a polarization beamsplitter. By creating distinct paths, each code can be independently processed and combined to form a single path using a polarization splitter and retarder stack. The system preferably includes an input retarder that aligns a first spectrum of a light from a light source, along a first polarization state, and aligns a second spectrum of the light from the light source, along a second polarization state different than the first polarization state, and a beam splitting unit, optically coupled to the input retarder, and including a first beamsplitter that transmits the first spectrum, as a transmitted spectrum, and that reflects the second spectrum, as a reflected spectrum. The system also includes a first spatial light modulator optically coupled to the beam splitting unit, that alters and reflects the transmitted spectrum, as a modulated transmitted spectrum, towards the beam splitting unit, and a second spatial light modulator optically coupled to the beam splitting unit, that alters and reflects the reflected spectrum, as a modulated reflected spectrum, towards the beam splitting unit. The beam splitting unit combines the modulated transmitted spectrum and the modulated reflected spectrum into a combined spectrum.

43 Claims, 16 Drawing Sheets

OPTICAL SYSTEM FOR PRODUCING A MODULATED COLOR IMAGE

CROSS-REFERENCE TO RELATED APPLICATIONS

This application is a continuation-in-part of U.S. patent application Ser. No. 09/241,400 filed Feb. 2, 1999 now U.S. Pat. No. 6,452,646; which is a continuation of U.S. patent application Ser. No. 08/853,461 filed May 5, 1997 now U.S. Pat. No. 5,999,240; which is a continuation-in-part of both U.S. patent application Ser. No. 08/447,522 filed May 23, 1995 now U.S. Pat. No. 5,751,384 and U.S. patent application Ser. No. 08/645,580 filed May 14, 1996 now U.S. Pat. No. 5,827,021. This application is also a continuation-in-part of U.S. patent application Ser. No. 09/466,053 filed Dec. 17, 1999 now U.S. Pat. No. 6,380,999; which is a continuation-in-part of U.S. patent application Ser. No. 09/215,208 filed Dec. 18, 1998 now U.S. Pat. No. 6,078,374; which is a continuation-in-part of U.S. patent application Ser. No. 08/901,837 filed Jul. 28, 1997 now U.S. Pat. No. 6,046,786; which is a continuation of U.S. patent application Ser. No. 08/419,593 filed Apr. 7, 1995 now U.S. Pat. No. 5,658,490. U.S. patent application Ser. No. 09/466,053 also claims priority from U.S. Provisional Application No. 60/113,005 filed Dec. 18, 1998, U.S. Provisional Application No. 60/121,494 filed Feb. 24, 1999 and U.S. Provisional Application No. 60/134,535 filed May 17, 1999. This application also claims priority to U.S. Provisional Application No. 60/134,223 filed May 14, 1999. The disclosures of all of the above applications are incorporated by reference in their entirety.

BACKGROUND OF THE INVENTION

1. Field of the Invention

The present invention relates to image formation, and more particularly, to optical systems which employ color-selective polarizing elements for forming color images.

2. Background of the Related Art

Optical projection systems in the related art use transmissive thin-film-transistor (TFT) liquid crystal display (LCD) panels. Multi-layer evaporated thin-film dichroic beamsplitters that are tilted with respect to the axis of incident light are used to create physically distinct paths, each representing the spectral power in one portion of an additive primary color band red-green-blue (RGB). An LCD in each path controls the local light transmission level of a particular primary color band. Modulated or imagery light is recombined with additional tilted isotropic coatings and full-color imagery is projected onto a front or rear projection screen.

In transmissive systems, the LCD is positioned between crossed polarizers as an approach to obtain high contrast ratios for most LC electro-optic modes. In reflective systems, where light is incident substantially normal to the LCD panel, the analogous configuration is to position a polarizing beamsplitter (PBS) directly in front of the panel, as described in a parent application, incorporated by reference above.

One type of polarization beam splitter is a tilted thin-film stack with four ports, which reflects or transmits a light spectrum based on its polarization. A PBS ideally functions as a broad-band reflector for a light spectrum polarized along one axis, and as a transmitter for a light spectrum polarized along an orthogonal axis. A dichroic beamsplitter ideally reflects or transmits a light spectrum based only on the wavelength of the light.

A full-color split-path projector may use reflective LCD panels, with dichroic beamsplitters for creating three color paths, a polarizing beamsplitter for each reflective LCD panel, and additional optics for recombining the imagery before the projection lens. Such implementations are cumbersome and expensive.

An alternative is to use a single polarizing beamsplitter, followed by a Philips prism for separating and combining the three color paths. In this architecture, the color splitting/combining structure is effectively positioned between the polarizer and an analyzer. A benefit from a component count standpoint is that the three color paths share the same PBS.

However, high contrast ratio mandates that the Philips prism preserves the input state of polarization for each color path so that light efficiently exits the input port. This condition must be maintained such that the contrast ratio averaged over the f-number of the system is 100:1, and ideally exceeds 200:1. Clean up polarizers, and in some cases additional polarization optics, such as quarter-wave plates, between the LCD panel and prism can then be used to improve the contrast ratio.

In the Philips prism, red and blue are first reflected by a dichroic coating and then total internally reflected (TIR) before impinging on an LCD. Polarization modulated light then returns along the same path. The spectral characteristics of the dichroic coating are strongly dependent on incidence angle, creating a significant cross-talk between color channels. To help overcome problems with cross-talk, a "double notch" filter (DNF) is frequently inserted which substantially blocks interband light, such as true cyan and true yellow. The DNF is also a multi-layer coating, but because it is used at near normal incidence, it is less sensitive to changes in incidence angle. Nonetheless, when averaged over the f-number of the system, the density of light at the notch is reduced.

Accordingly, related art three-panel reflective projection systems use a PBS, a DNF, and a Philips prism, each of which consists of three prisms, two of which have dichroic mirror coatings. To achieve the performance of transmissive systems using reflective LCD panels, an architecture is required that reduces the complexity and cost, while increasing contrast ratio and throughput.

Multi-layer thin-film coatings are used in the related art for manipulating color in projection display systems. This technology is well matched to the high efficiency and high power handling requirements of projection. Moreover, the steep transition slopes desired to maximize luminance, while meeting color coordinate standards, can be achieved. However, tilted isotropic coatings can degrade polarization quality, particularly in low f-number systems. In LCDs, polarization must be accurately preserved in order to achieve low dark state leakage. Furthermore, dichroic mirrors have an angle sensitive half-power wavelength that shifts substantially with incidence angle.

In order to create physically distinct color paths using a dichroic mirror, the layers are often substantially tilted with respect to the axis of incident light. This significantly increases the spectral shift covered by small angular excursions with respect to the bias angle. At a worst case bias angle of 45°, the wavelength (spectral) shift is approximately linear with angular change.

Fundamentally, the apparent thickness of each layer in a thin-film stack is reduced with an off-normal incidence angle, resulting in a blue shift of the spectrum. When a bias angle is present, both blue and red shifts are present in the plane of incidence. Such angle sensitivity can limit the f-number in color management systems and, in particular, LCD projectors.

Reflective silicon display panels are readily known in the related art. The most common reflective silicon display panels are VLSI-based active-matrix panels that are processed to have a high or flat fill factor, and high visible reflectivity. Alternatively, polysilicon panels can be made to function as reflective displays. In VLSI-based panels, a thin liquid crystal film is sandwiched between the silicon chip and a cover glass coated with a transparent conductor, typically indium tin oxide (ITO). The liquid crystal can be either a nematic or smectic material, both of which are well documented in the art. The liquid crystal is an anisotropic medium, which responds to an electric field by changing its orientation. This in-turn changes the polarization state of light propagating through the liquid crystal.

FIGS. 1(a) and 1(b) illustrate related art reflective display architectures where light having a single polarization state is introduced. As shown in FIG. 1(a), light enters a polarizing beamsplitter (PBS) 10 through a first port 12, and is reflected out a second port 14 towards a reflective LCD panel 20. The LCD panel 20 reflects the light back through the second port 14 and the PBS 10, where the light exits via a third port 16. In FIG. 1b, the light enters the PBS 10 through the third port 16, travels through the PBS 10, and exits through the second port 14. The LCD panel 20 reflects the light back through the second port 14, where the light is reflected by the PBS 10 and exits via the first port 12.

The polarization state of reflected light is locally modulated via the voltage dependent distribution of the LC molecules at each pixel of the LCD panel 20. This polarization encoded imagery is converted to an actual gray shade image using an analyzing polarizer. In the retroreflecting arrangements shown in FIGS. 1(a) and 1(b), light is introduced and analyzed using the PBS 10. The PBS 10 effectively positions the LCD panel 20 between crossed polarizers, and also directs light through the system and ultimately to projection lenses.

SUMMARY OF THE INVENTION

An object of the present invention is to substantially obviate one or more of the problems due to limitations and disadvantages of the related art.

Another object of the present invention is to reduce the complexity and cost while increasing contrast ratio and throughput of reflective LCD systems.

Still another object of the present invention is to reduce the f-number in color management systems while maintaining contrast ratio.

It is recognized, in commonly owned U.S. Pat. No. 5,751,384, the contents of which are incorporated herein by reference in their entirety, that retarder stacks can be used in conjunction with neutral polarization splitters to create separate color paths and to combine separate color paths to form a single path. There are inherent benefits of this technology, particularly in terms of angle sensitivity.

The present invention can be achieved, in whole or in part, by an optical system including an input retarder that transforms a first spectrum of input light from a light source along a first polarization state, and transforms a second spectrum of the input light from the light source along a second polarization state different than the first polarization state, and a beam splitting unit, optically coupled to the input retarder, and including a first beamsplitter that transmits the first spectrum as a transmitted spectrum, and that reflects the second spectrum as a reflected spectrum.

The present invention can also be achieved, in whole or in part, by a system that divides input light from a light source into component color bands, red, green, and blue by making the colors travel different physical paths. At least two of these paths are created using stacked retardation films and a polarization beamsplitter (PBS). By creating distinct paths, each color band can be independently processed. According to preferred embodiments of the present invention, such processed light can be combined to form a single path, again using a retarder stack (RS) and a PBS. The present invention is particularly suited to projectors using reflective liquid crystal on silicon display panels.

The present invention can also be achieved, in whole or in part, by merging color and polarization management to produce a split-path projector, based on reflective display panels, that is simple in construction. Retarder stack (RS) components create orthogonally polarized primary colors from a polarized input. In this exemplary embodiment, a PBS functions as a color splitter, allowing all four ports of the PBS to be utilized. The port containing the subtractive primary band can be further split using a dichroic beamsplitter. In one embodiment of the reflective architecture, all three paths are recombined and analyzed by the input PBS. Full-color imagery can exit the previously unused fourth port of the PBS. A full-color projector according to the present invention would therefore require only one PBS coating and one dichroic color splitter coating, along with one or two retarder stacks.

The present invention can further be achieved, in whole or in part, by improving polarization management associated with color optical systems to provide a high contrast ratio. The reduced angle sensitivity exhibited by the retarder stacks of the present invention, relative to dichroic splitters, also results in the projectors of the present invention having high contrast ratios.

The present invention can also be achieved, in whole or in part, by providing a wide color gamut with minimal hardware. An aspect of the invention is the recognition that an exit retarder stack, used to manage light leakages from the PBS, can also be used to generate inter-band notch filtering operations. This eliminates the need for an auxiliary notch filter, which is used frequently with related art systems that utilize the Philips prism. Using different input and exit retarder stacks, inter-primary light, such as that produced by a metal halide lamp, can be diminished or eliminated by the exit clean up polarizer. This eliminates the need for a separate double notch filter (DNF).

The present invention can still further be achieved, in whole or in part, by providing an optical system, such as a reflective LCD projector, that exhibits high overall throughput, or brightness. This is achieved by manipulating color bands with stacks of lossless polymer retarder films, by providing refractive index matching between the retarder films, and by minimizing the number of lossy polarizers. It is further accomplished by eliminating the need for an auxiliary filter for eliminating inter-primary light.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
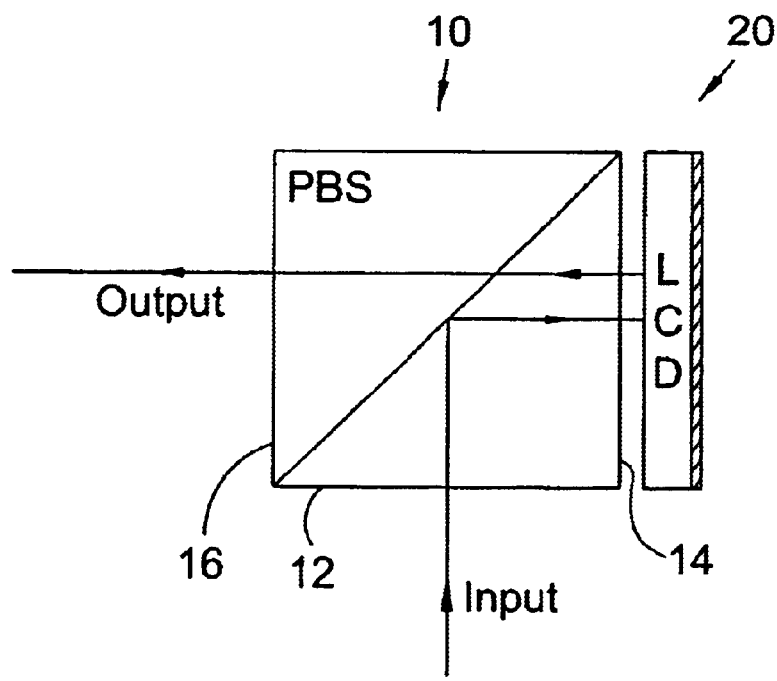
FIGS. 1(a) and 1(b) illustrate related art reflective display architectures, where light of a single polarization is introduced through a first port and is transmitted through a second port towards a reflective LCD panel.
Figure 1:
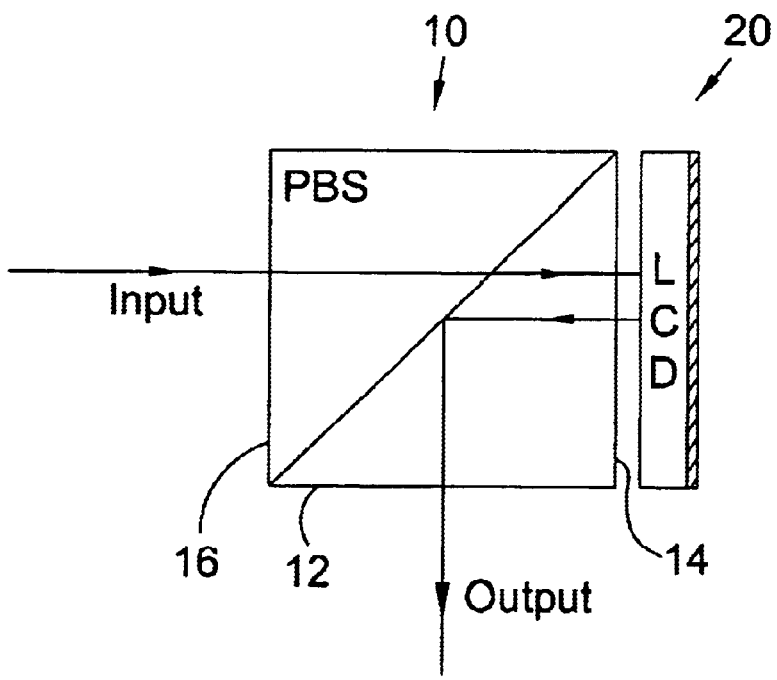
Figure 2:
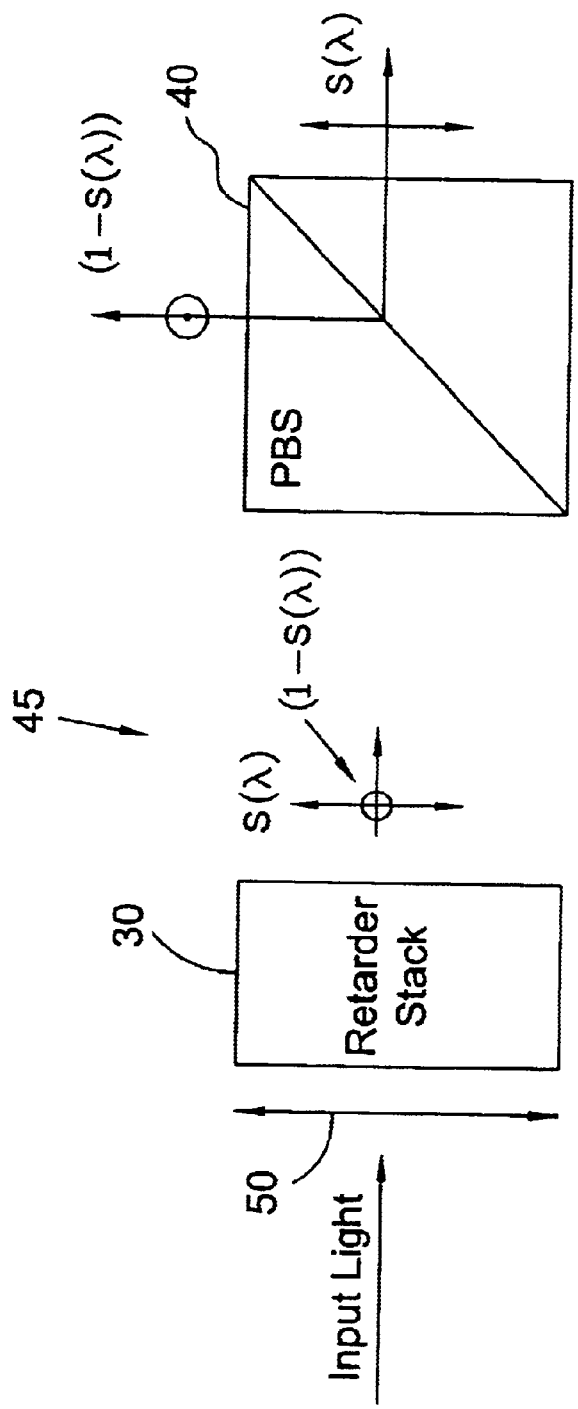
FIG. 2 shows a retarder stack and PBS polarization-based color splitter, in accordance with a preferred embodiment of the present invention.

The embodiments of the present invention are set forth below with reference to the drawings in detail in which like numerals indicate the same or similar elements in each of the Figures. Various elements and terms such as "retarder", "retarder stack," "spectrum," "complementary spectrum," "spatial light modulator," "doubler," etc. have been explained and/or defined in the parent applications; the use of such terms in this description corresponds to the meanings set forth in those parent applications. FIG. 2 shows polarization based color splitter 45 that can produce two polarized color paths in accordance with the present invention. The color splitter 45 comprises a retarder stack (RS) 30 and polarizing beamsplitter (PBS) 40. Details of the construction and operation of retarder stack 30 are found in the parent applications, incorporated by reference above.

In operation, polarized input light from a light source (not shown) is directed to retarder stack 30. An optional polarizer 50 can be used if the input light is unpolarized, or to improve the contrast ratio of polarized input light. The retarder stack 30 receives the polarized input light and converts the polarization of a primary color to one polarization state $S(\lambda)$ and converts the polarization of its complementary color to an orthogonal polarization state $(1-S(\lambda))$. In the embodiment shown in FIG. 2, the PBS 40 is oriented so that the complementary color is reflected by the PBS 40 and the primary color is transmitted by PBS 40.

Figure 3:
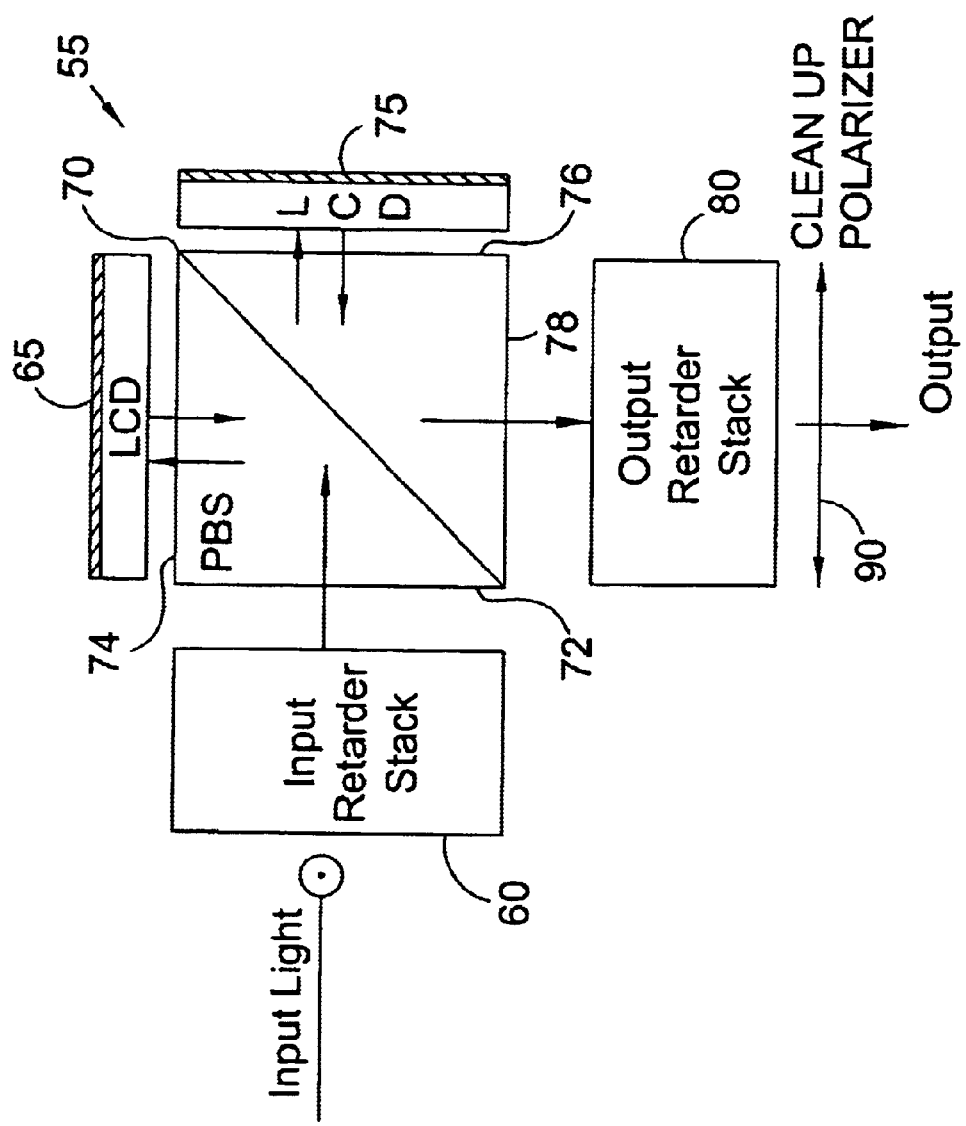
FIG. 3 illustrates an optical system, in accordance with another preferred embodiment of the present invention.

FIG. 3 illustrates a projection system 55, in accordance with one embodiment of the present invention. The projection system 55 includes input and output retarder stacks 60,80, reflective spatial light modulators 65, 75, a PBS 70 and a cleanup polarizer 90. In this embodiment, the reflective spatial light modulators 65, 75 are liquid crystal spatial light modulators. However, as understood by those skill in the art any reflective spatial light modulator can be employed in this embodiment and in later embodiments where reflective liquid crystal spatial light modulators are shown for illustrative purposes. In operation, at least partially polarized input light propagates through the input retarder stack 60, which polarizes a primary color along one polarization state and its complementary color along an orthogonal polarization state.

The retarder stacks 60 and 80 are optically coupled to the polarizing beam splitter. The expression "optically coupled," as used herein, refers to any configuration in which light passing through or reflected from an optical element is incident on a second optical component either directly or through one or more intermediate optical elements. For retarder stack 60, light transmitted through the stack is incident on PBS 70 through a first port and a first one of the colors is reflected by the PBS 70 through a second port. The polarizing beam splitters of the present invention are selected from any optical element which can separate light of different polarizations and, in particular, to devices which can separate orthogonally polarized states of light and direct them along substantially orthogonal output paths.

The primary color spectrum is modulated and reflected by the LCD 65 through the second port, into PBS 70, where it is output via a third port. The complementary color spectrum is transmitted through the PBS 70 through a fourth port, and is modulated and reflected by the LCD 75 back towards the PBS 70. The PBS 70 reflects the complementary color spectrum, which exits via the third port with the primary color spectrum. The light propagates through an output retarder stack 80 which encodes both the primary color spectrum and the complementary color spectrum along the same polarization state. Then a clean-up polarizer 90 polarizes the light to improve its contrast ratio and to block cross-talk light prior to output.

FIG. 3 shows that PBS leakage can be minimized by placing an output retarder stack 80 at the exit port. This restores the desired light to a single polarization state, allowing the clean-up polarizer 90 to block all cross-talk light.

Figure 4:
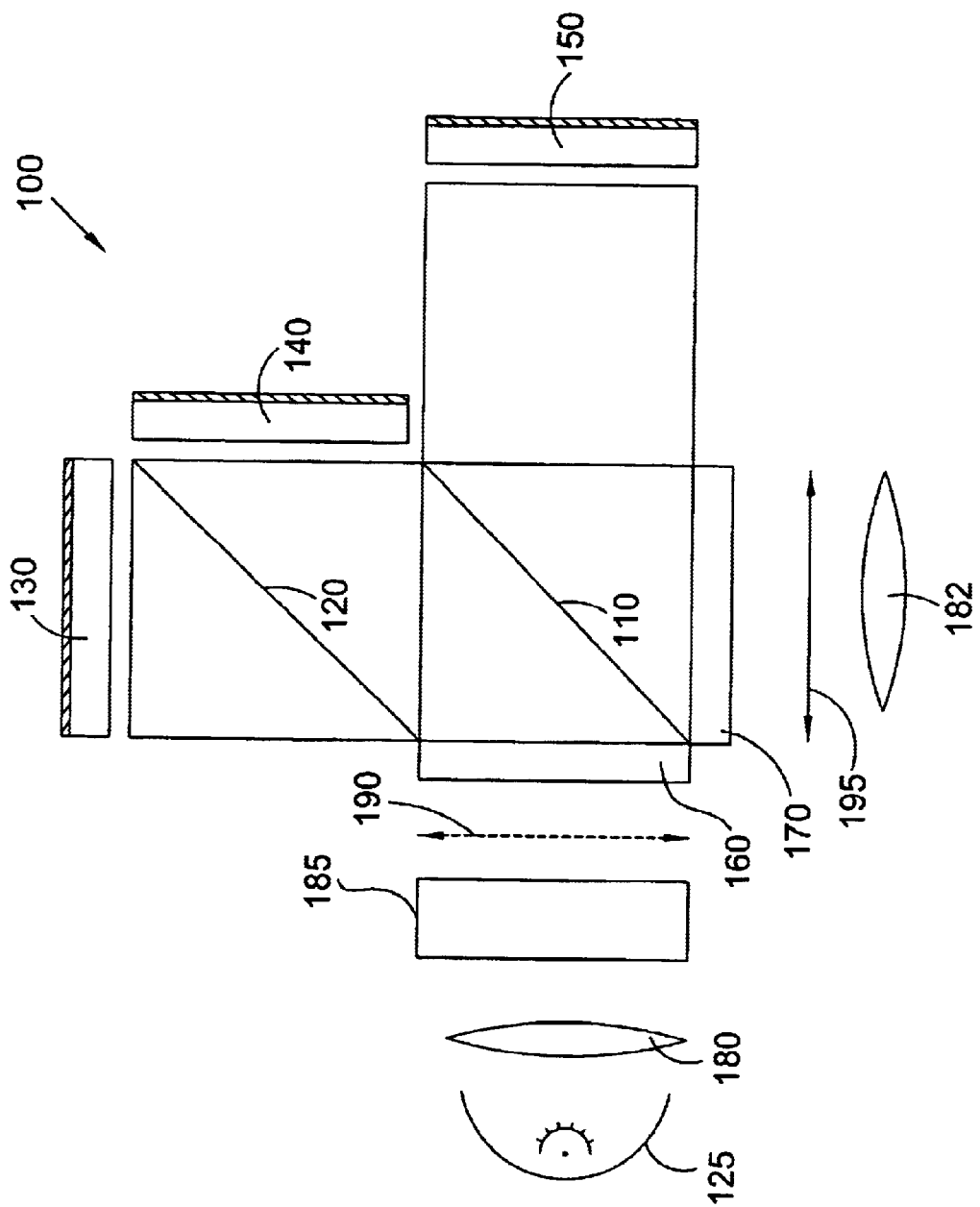
FIG. 4 illustrates an optical system including a three panel reflection display system, in accordance with yet another preferred embodiment of the present invention.

FIG. 4 illustrates an optical system 100 in accordance with yet another embodiment of the present application. The system 100 includes a first beamsplitter 110, color separator 120, first, second and third reflective modulators 130, 140, 150; first and second retarders stacks 160, 170; first and second clean-up polarizers 190, 195; a polarization conversion array 185; first and second optic lenses 180, 182 and a light source 175. While individual lenses 180 and 182 are schematically depicted in FIG. 4, it is understood that these lenses are merely representative of focusing, collimating, and projection optics which may include one or more optical components, as are known in the art. Generally, any optical system capable of performing focusing and projecting may be used as elements 180 and 182. In this embodiment, the beamsplitter 110 is a PBS that transmits or reflects the light based on the polarity of the light, and the color separator 120 is typically a dichroic beamsplitter that transmits or reflects light based on the wavelength of the light. Moreover, the first, second and third reflective spatial light modulators 130, 140, 150 are, in a preferred embodiment, selected from liquid crystal modulators, and can be nematic on silicon, or FLC on silicon. The light source 175 is an incandescent lamp, laser, light emitting diode (LED), ultra-high pressure metal halide lamp (UHP), an ultra-high pressure mercury lamp, fusion lamp, or another source of light.

In FIG. 4, light from the light source 175 is collimated, and may undergo polarization conversion at the polarization conversion array 185, before being polarized by the first clean-up polarizer 190. The first retarder stack 160 encodes a first primary color along one polarization state and its complementary color along an orthogonal polarization state. In this example, the complementary color is reflected and the primary color is transmitted by the beamsplitter 110. The color separator 120 separates the reflected complementary color into second and third primary colors, which are spatially modulated by the first and second reflective modulators 130, 140. The first primary color is spatially modulated by the third reflective modulators 150. The first, second, and third primary colors are spatially modulated by polarization of the light in accordance with image information being supplied to each reflective modulator 130, 140, 150.

The separated light is then recombined. The spatially modulated second primary colored light is transmitted through color separator 120 and beamsplitter 110, respectively. The spatially modulated third primary colored light is reflected by the color separator 120 and transmitted through the first beamsplitter 110. The spatially modulated first primary colored light is reflected by the first beamsplitter 110. The second and third primary colored lights are recombined to form a spatially modulated complementary color, and is transmitted with the spatially modulated first primary color through a second retarder stack 170, that rotates the spectrum of $\overline{S}$ polarized first primary color into $\overline{P}$ polarized light and leaves the $\overline{P}$ polarization spectrum of the complementary color undisturbed. Hence the first primary color spectrum and the complimentary color spectrum merge to form modulated white light which passes through the second clean-up polarizer 195, and is then output through the projection optic lens 182. Each primary color of the modulated white light has equal path lengths through the system 100.

Figure 5:
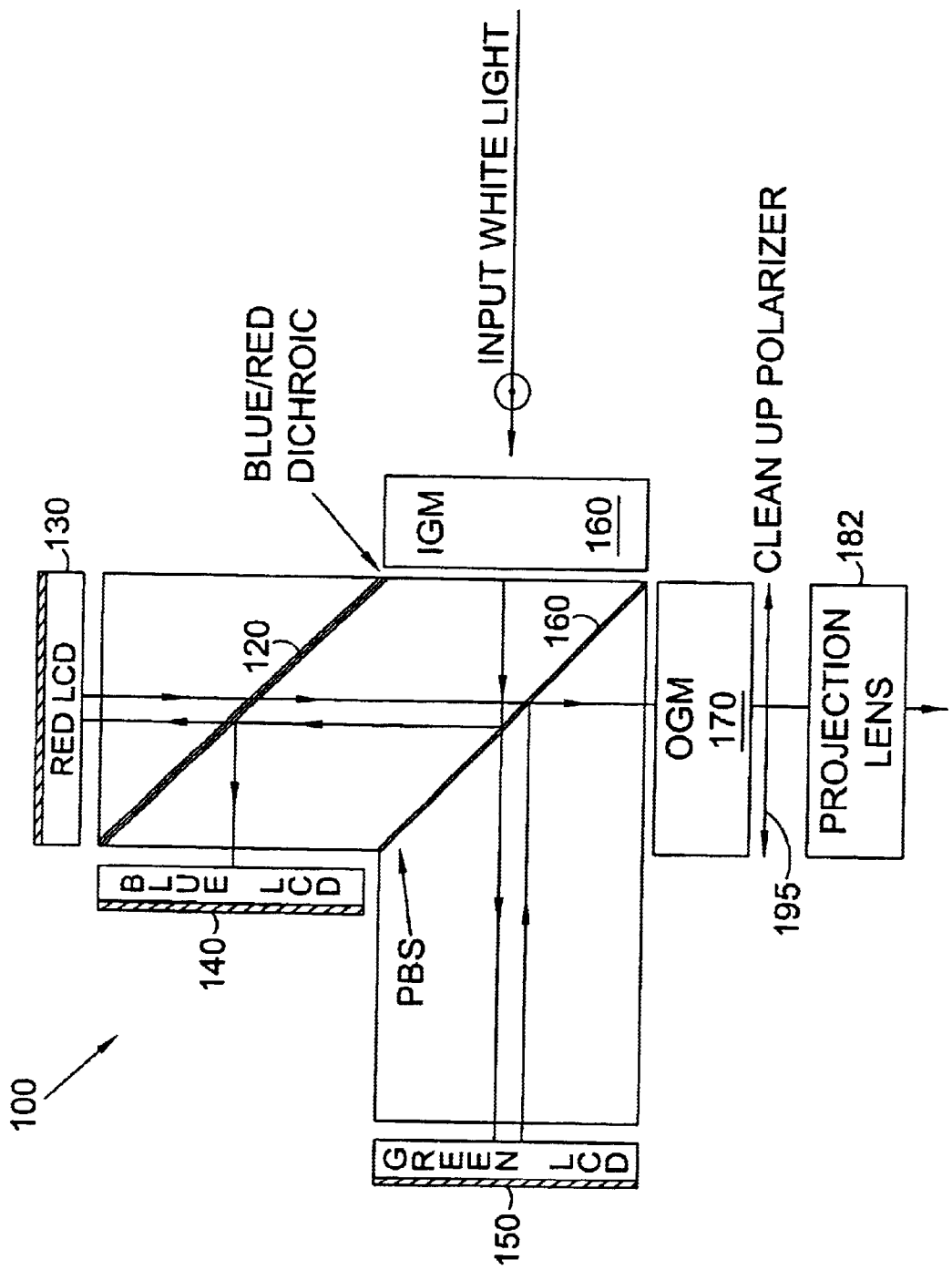
FIG. 5 illustrates another optical system including a three panel reflection display system, in accordance with still another preferred embodiment of the present invention.
Figure 6:
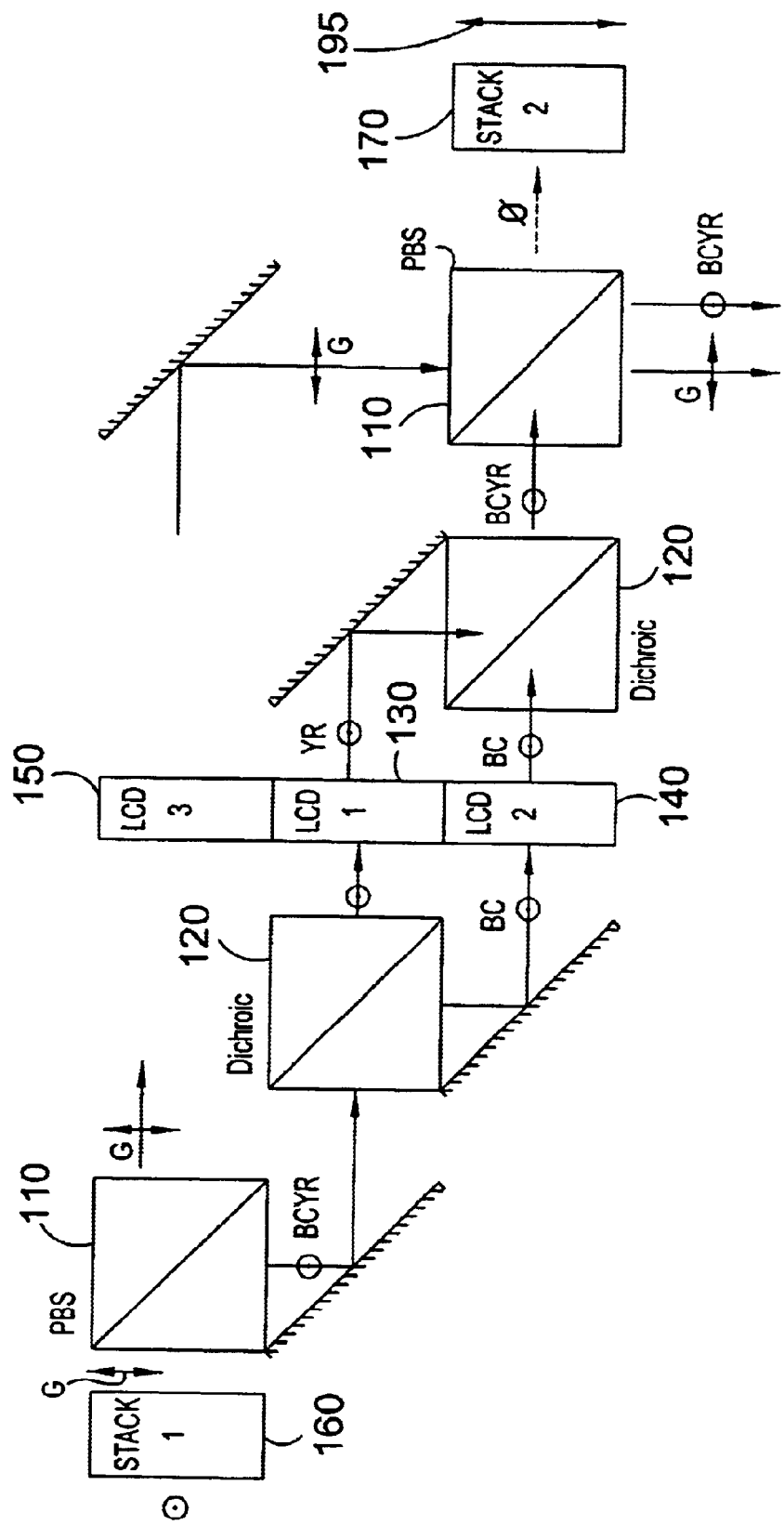
FIG. 6 illustrates an equivalent unfolded arrangement of the three-panel reflective display system of FIG. 5, with the reflective display system in the off-state.

FIG. 5 illustrates another three-panel reflective optical system in accordance with still another preferred embodiment of the present invention. FIG. 6 illustrates an unfolded arrangement of the three-panel reflective optical system of FIG. 5, in an off-state, for ease of polarization tracing. Within all the drawing figures, it should be understood that like elements are identified by like reference numbers. Accordingly, repetitive descriptions are not included herein in the interest of brevity.

In FIG. 5, input white light from the light source may be linearly polarized using a polarization conversion array (not shown) to enhance efficiency and polarized by a cleanup polarizer (not shown). The first retarder stack 160, here an input green/magenta (IGM) stack, transits the input white light with green light polarized orthogonal to blue and red light. In this example, green light exits the IGM $\overline{P}$ polarized, and the inverse spectrum, or complementary colored magenta light is $\overline{S}$ polarized. As such, the beamsplitter 110 which in this example is a PBS, transmits only green light, and reflects magenta light.

In the off (dark) state shown in FIG. 6, light is reflected from the reflecting modulators 130, 140, 150, which, for this example, are red, blue, and green LCDs, respectively, with no change in the state of polarization (SOP). Red and blue light are split by the color separator, which in this example is a dichroic splitter, such that blue B, and true cyan C are reflected to the second reflection modulator 140 (blue LCD), and true yellow Y and red R are transmitted to the first reflection modulator 130 (red LCD). The reflected light returns with no change in the SOP and recombines at the color separator 120. Light returning to the beamsplitter 110 remains $\overline{S}$ polarized, and is therefore efficiently reflected by the beamsplitter 110. Thus all light exits the input port and the contrast ratio is very high to this level of approximation.

In reality, the first beamsplitter 110 has finite polarization efficiency. In most instances, the leakage of $\overline{P}$ polarized light into the S-port is substantially larger than the leakage of $\overline{S}$ polarization into the P-port often by a factor of ten, at normal incidence.

There is significant ($\epsilon_p$=2–4%) green light reflected by the first beamsplitter 110, and insignificant light transmitted from the inverse spectrum by the first beamsplitter 110. In fact, a low f-number such as a ±12° incidence angle can produce $\epsilon_p$=40%. Thus, maintaining contrast ratio over typical projection f-numbers requires the cleanup polarizer 195.

Figure 7:
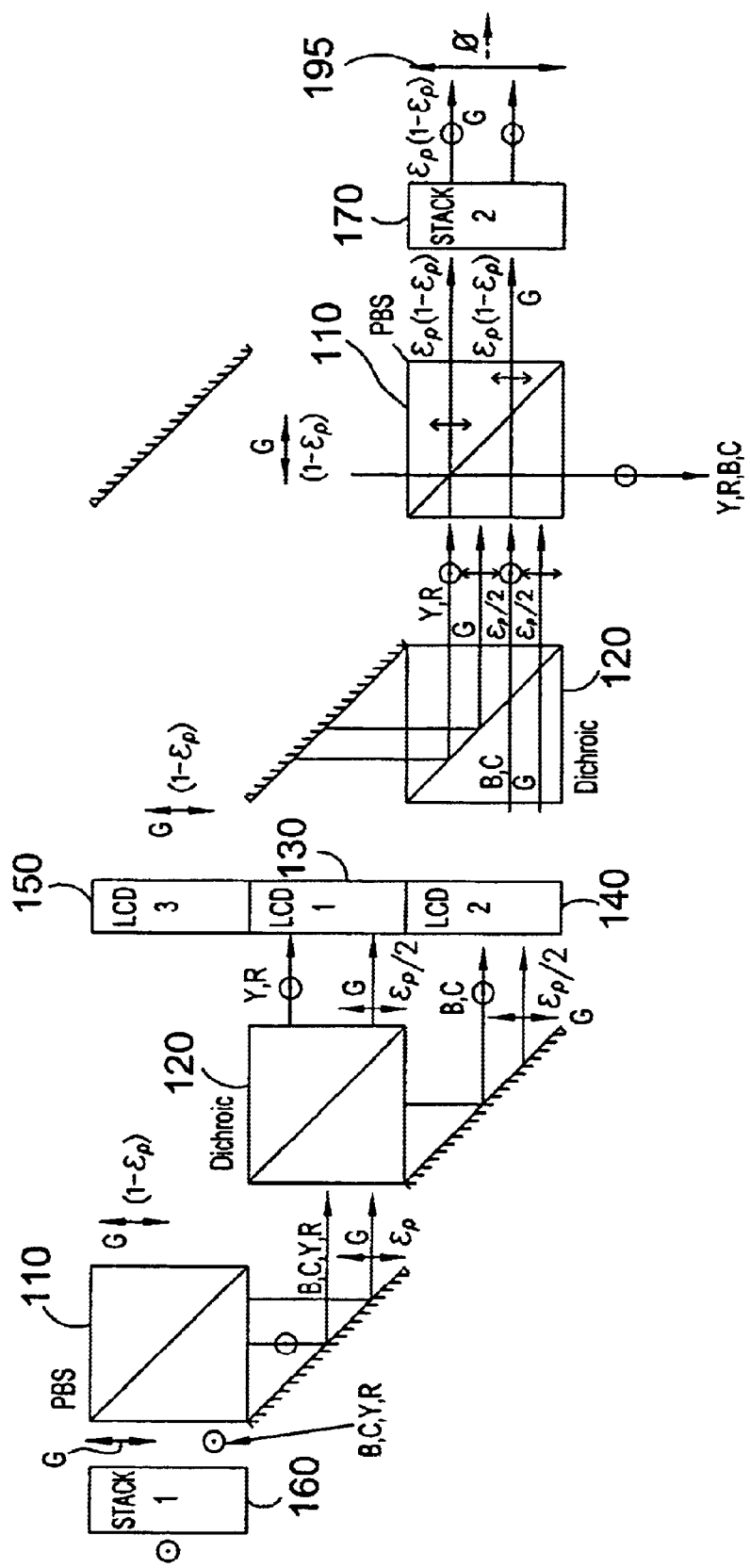
FIG. 7 illustrates another equivalent unfolded arrangement of the three-panel reflective display system shown in FIG. 5, with the reflective display system in the off-state.

FIG. 7 illustrates light leakage through the system shown in FIG. 5, when the optical system is in the dark (off) state, under the assumption that $\epsilon_s$ can be neglected relative to $\epsilon_p$. In the off-state, green light transmitted by the first beamsplitter 110 with transmission $(1-\epsilon_p)$ is reflected by the third reflective modulator 150 with no change in the SOP. It is analyzed by the first beamsplitter and leaks $\epsilon_p(1-\epsilon_p)$ into the output port. Green input light ($\epsilon_p$) reflected by the first beamsplitter 110 is split by the color separator (dichroic splitter) 120 and is returned by the first and second reflective modulators 130,140 with no change in the SOP.

The green input light reflected by the first beamsplitter (PBS) 110 is then combined by the dichroic splitter and returns to the PBS 110. This $\overline{P}$ polarized light is transmitted by the PBS 110 with leakage $\epsilon_p(1-\epsilon_p)$, and is combined with the leakage from other parts of the system. Due to the lack of system coherence, these components essentially combine on a power basis. Light comprising the inverse spectrum (or complementary color) is efficiently reflected by the PBS 110, and is assumed to contribute relatively little to the system contrast ratio.

According to this example of the preferred embodiment, in order to maintain high contrast ratio, a second retarder stack 170, here an output green/magenta (OGM) stack is placed at the output port along with the clean-up polarizer 195 that is crossed with the input polarizer. The second retarder stack 170 converts $\overline{P}$ polarized light transmitted by the PBS 110 to $\overline{S}$ polarized light, with no effect on blue and red. The green leakage can subsequently be blocked by the clean-up polarizer 195.

Figure 8:
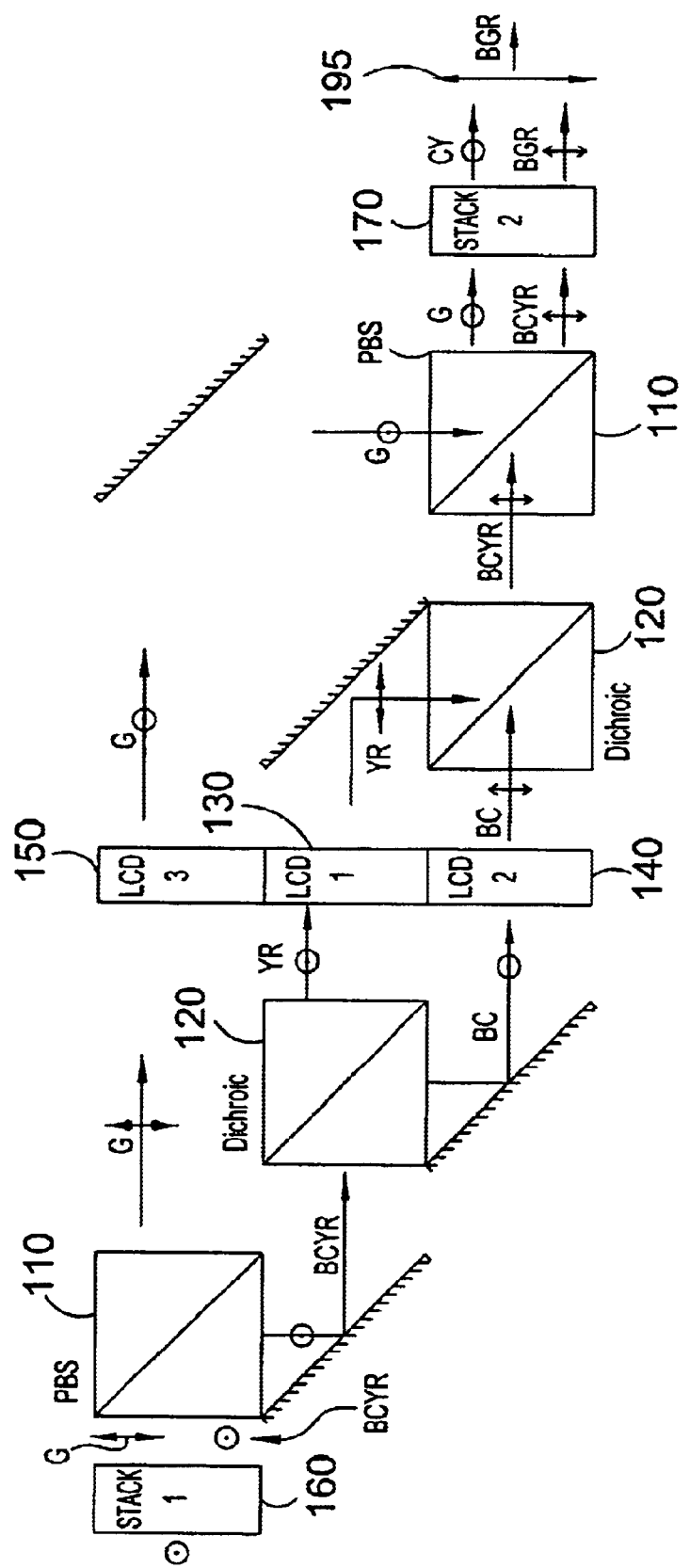
FIG. 8 illustrates an equivalent unfolded arrangement of the three-panel reflective system of FIG. 5, with the reflective display system in the on-state.

FIG. 8 illustrates an unfolded arrangement of the three-panel reflective system of FIG. 5, with the system in the white (on) state. The light transitions in FIG. 8 differ from the light transitions in FIG. 6 because the first, second and third reflective modulators 130, 140, 150 modulate and polarize the light orthogonally to the SOP of the input light. The spectrum reflected by the first reflective modulator 130 is transmitted by the color separator 120, which in this example of the preferred embodiment is a dichroic beamsplitter, and is combined with the spectrum reflected by the second reflective modulator 140. The combined spectrum, which is the complementary color of the first primary color, is transmitted through the first beamsplitter 110, the second retarder stack 170 and the second cleanup polarizer 195. The spectrum reflected by the third reflecting modulator 150 is reflected by the first beamsplitter 110 and joins the complementary colored combined spectrum. The spectrum of the primary color is then polarized by the second retarder stack such that its SOP matches the SOP of the light of the complementary color, and exits the system.

In this example of the preferred embodiment of the invention, the R,Y colored light is modulated by the red LCD (first reflected display 130), and the B,C colored light is modulated by the blue LCD (second reflective display 140). In this example, all four colors enter the first beamsplitter 110 in the return path $\overline{P}$ polarized. The first beamsplitter 110 reflects all $\overline{S}$ polarized green light, and transmits all $\overline{P}$ polarized (BCYR) light.

According to this preferred embodiment of the present invention, the second retarder stack 170 (OGM) differs in design from the first retarder stack 160 (IGM). The OGM has a broader magenta notch than the IGM, such that a substantial portion of power in the C and Y band is rotated by 90°. Thus, the OGM has the dual function of restoring the SOP of green light for maximizing contrast ratio, and for dumping a portion of the C and Y band to improve the color gamut.

According to this preferred embodiment, green light is not transmitted through tilted isotropic coatings in the path between the first beamsplitter 110 and the third reflective modulator 150. This maximizes contrast in the green light, which has the greatest impact on system level contrast ratio. In a round trip of the related art Philips prism, green light effectively passes through four titled isotropic stacks. The result, with the Philips prism, is a loss in polarization fidelity, particularly for rays that do not lie in the plane containing the stack normal ($\overline{S}$ rotations).

According to this example of the preferred embodiment, reflected light from the first beamsplitter 110 impinges on the color separator 120, which here is a dichroic splitter (mirror) preferably designed to have a half-power point in the green color. Element 120 separates and combines blue light and red light. The elimination of green light from this port relaxes the performance requirements on color separator 120 but does not establish transition band characteristics since there is no light present in the transition band. As such, spectral shifts of a few degrees cause relatively little cross-talk between the first and second reflecting modulators 130, 140 (red and blue LCDs), and therefore relatively little loss in color performance. Polarization modulated light from the first and second reflective modulators 130, 140 is recombined by element 120 and is then analyzed by the beamsplitter 100.

The color separator is typically a dichroic splitter which functions as a color selective mirror that reflects substantially all of one primary band and transmits substantially all of the complementary primary band. Though often steep, there is a finite transition band in which portions of a spectral component are both transmitted and reflected. Because the mirror is tilted with respect to the axis of incident light, the dichroic splitter can be considered to have linear Eigenstates. The characteristics can thus be extracted by probing the transmitted/reflected fields with polarizations parallel and perpendicular to the plane of incidence.

Projections of a polarization along both Eigenstates can cause a phase difference (retardation) of such collinearly propagating fields and a resulting impact on the SOP. Dichroic mirrors typically have transition bands for $\overline{S}$ and $\overline{P}$ polarizations that are non-overlapping. This separation depends upon the center wavelength, the specific stack design and the incidence angle. Far from the transition band, where substantially all light is reflected or transmitted, the structure has no effect on the degree of polarization. However, within the band that separates the two transmission spectra, the structure behaves like a polarizing beamsplitter.

For a wavelength at which the dichroic splitter reflects $\overline{S}$ polarization and transmits $\overline{P}$ polarization, in the on-state, where the LCD rotates light by 90-degrees, this light is rejected by the fourth port of the dichroic splitter. This creates a notch that can, in principle, be used to improve color coordinates. However, if this band encroaches on the primary color bands at angles within the f-number of the system, significant transmission losses can result.

Figure 9:
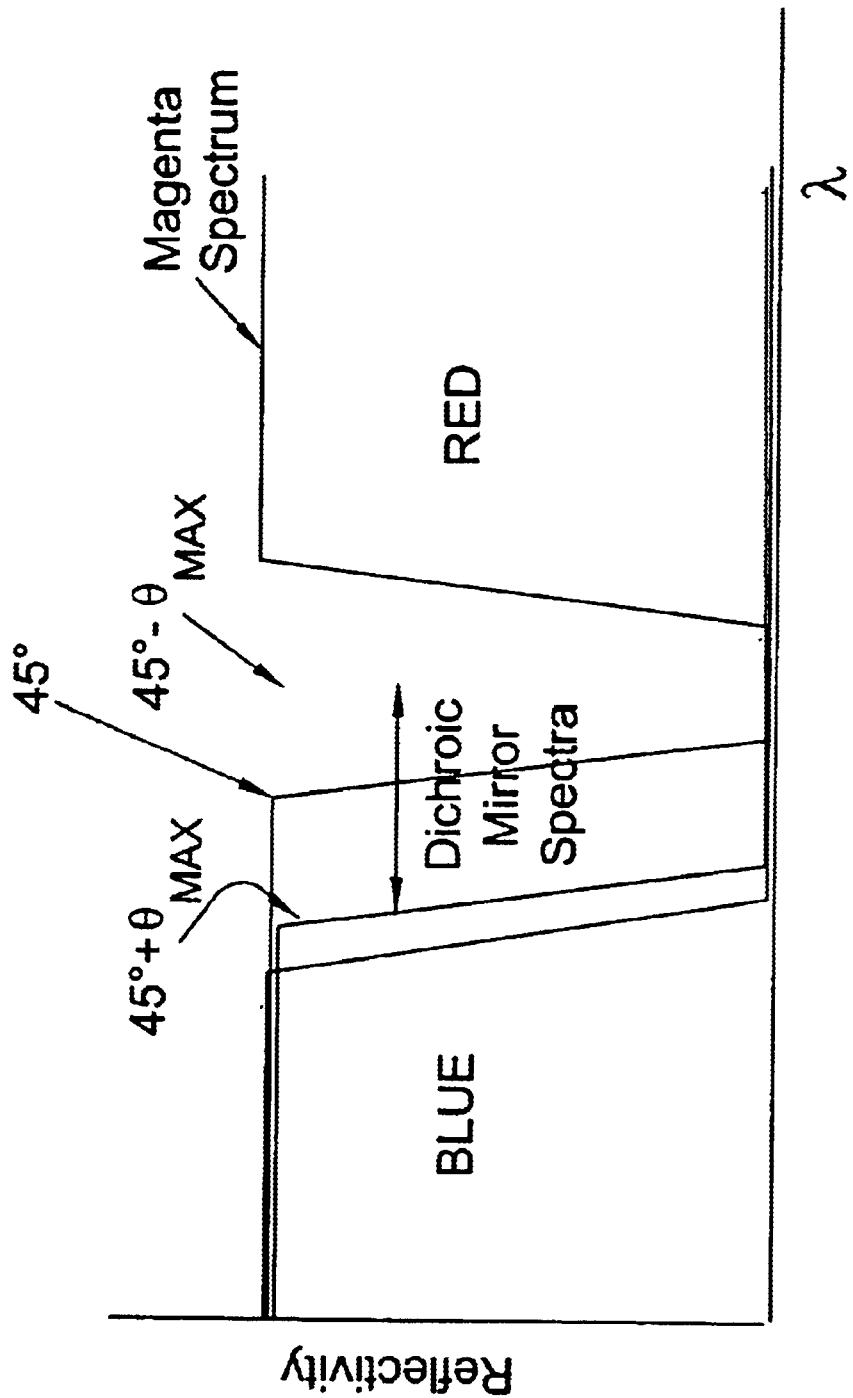
FIG. 9 illustrates a transition band for the reflective display system of FIG. 5.

According to a preferred embodiment of the present invention, a dichroic splitter has substantially zero polarizing properties (10–15 nm separation of the half-powerpoint), to minimize the transition bandwidth for the combined $\overline{S}$ and $\overline{P}$ spectra, which maximizes throughput of blue and red light with the lowest f-number. As previously discussed, for this example, the first retarder stack 160 (IGM) encodes green along one polarization state and magenta along an orthogonal polarization state. Then the first beamsplitter 110, as a polarizing beamsplitter, transmits green light and reflects magenta, and thus eliminates the green portion of the spectrum from the port containing the second (dichroic) splitter 120. The dichroic splitter transition band is positioned in the green such that the angle sensitivity has no effect on the chrominance of each output, as shown in FIG. 9, which illustrates the transition band of the preferred embodiment shown in FIG. 5. The preferred dichroic splitter has a half-power point substantially centered in this band, such that reflectivity of blue (or red), and transmission of red (or blue) remain high over the entire f-number of the system.

Figure 10:
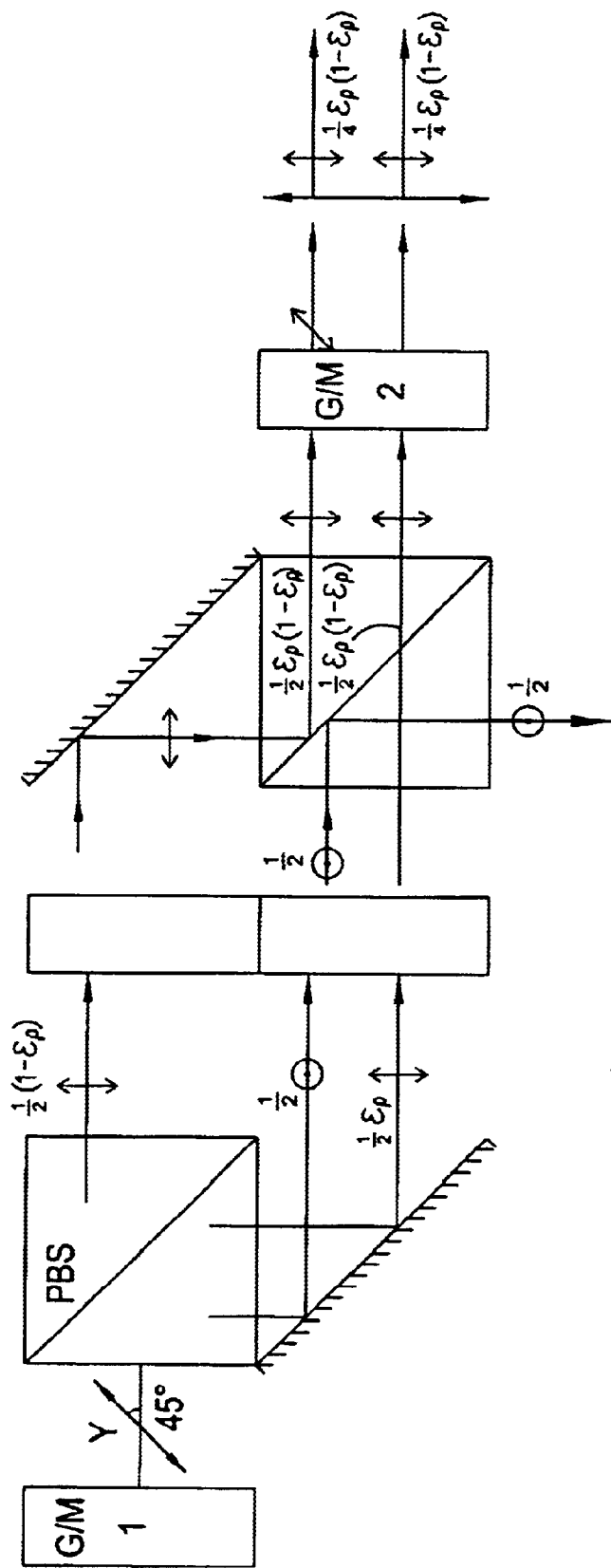
FIG. 10 shows light leakage through the reflective display system of FIG. 5, when the reflective display system is in the off-state.

In the absence of additional filtering, light that falls in transition bands of the first and second retarder stack 160, 170 is shared between two ports of the first beamsplitter 110, as illustrated in FIG. 9. By independently tailoring the IGM and OGM stack designs, their interaction can yield the desired color performance. According to the preferred embodiments of this invention, the polarization of light occurring at strong source emissions, such as 578 nm, is controlled to maximize system contrast ratio. This interaction is illustrated in the following example in which identical stacks are used in both the input and exit ports. At a half-power point of a retarder stack, for example, at a wavelength in the yellow color band, power is ideally divided evenly by the first PBS beamsplitter 100. The SOP generated by the stack is 45° linear, but can be any SOP that has equal projections along the PBS eigenpolarizations. As shown in FIG. 10, $\overline{P}$ polarized light leaks into the output port of the PBS 110 from both green and magenta ports. In this case, the second retarder stack 170 rotates the leakage light by a non-optimum 45°. As such, substantially half of the leakage light is passed by the clean-up polarizer. Contrast can quickly degrade to about 10:1 at this wavelength.

To overcome this limitation, contrast ratio is maximized by creating first and second retarder stacks that optimally manage the SOP of off-state light that leaks through the first PBS beamsplitter (110). One approach to increase contrast includes raising the transition slope with additional films, and moving the transition band away from strong source emissions. A preferred approach is to create the first retarder stack 160 (IGM) with a transition band that is not overlapping with the second retarder stack 160 (OGM) transition band. Since $\overline{S}$ polarized light preserves contrast ratio, the spectra are separated to the extent that $\overline{P}$ polarized leakage is, for example, in general rotated about 90° by the stack 170 (OGM). In a preferred embodiment, both the first and second retarder stacks 160, 170 have zero-overlap.

An example full-color three-path projector in accordance with the preferred embodiment demonstrates both contrast ratio and color enhancement. The orientation of first and second retarder stacks 160,170 are shown in Table 1, with a z-stretched (Nz=0.5) polycarbonate film used for both stacks. The orientations of both stacks are symmetric about the same wavelength, and therefore the notch characteristics in cyan and yellow are fundamentally the same. The retardation is 1.5 waves at 545 nm, and is preferably 535 nm. Though slightly red shifted from optimum, the interaction between the stacks is wavelength invariant and the example thus serves to demonstrate the embodiment.

TABLE 1 orientation of the first retarder stack 160 (IGM) and the second retarder stack 170 (OGM), implemented with 1.5 waves at 545 nm.

| Film Number | First Retarder Stack Orientation | Second Retarder Stack Orientation |
| --- | --- | --- |
| 1 | 3.5° | −22.0° |
| 2 | 0.0° | −45.00 |
| 3 | 3.5° | −22.0° |
| 4 | 3.5° | 8.0° |
| 5 | −1.5° | 6.0° |
| 6 | 7.5° | 37.0° |
| 7 | −3.0° | 90.0° |
| 8 | 3.5° | 82.50 |
| 9 | 3.5° | 39.5° |
| 10 | −7.5° | 11.5° |
| 11 | 18.0° | 1.5° |
| 12 | −14.5° | −2.5° |
| 13 | 10.0° | −26.5° |
| 14 | −3.0° | −68.5° |

This example of the preferred embodiment includes a quartz-halogen lamp as the light source 175 followed by a dye-stuff S-oriented polarizer as the first cleanup polarizer 190. The output was measured using an optical spectrum analyzer (not shown). The demonstration was assembled using free-standing antireflection (AR) coated components. The first and second retarder stacks 160,170 have pressure sensitive adhesive cemented between broad-band antireflection coated windows and attached to input and output ports of the first beamsplitter 110. A red/blue dichroic mirror plate as the second beamsplitter 120, is located parallel to the PBS coating of the first beamsplitter 100, to accept $\overline{S}$ polarization light.

Reflective modulators 130, 140, 150 were formed by laminating retardation films to aluminum mirrors with a quarter wave retardation at 500 nm (blue), 560 nm (green) and 644 nm (red). Antireflection coated glass windows were placed over the retardation film, forming an index match. The reflective modulators 130, 140, 150 were mounted at the appropriate output ports of the optical system 100. The recombined light exiting the second clean-up polarizer 195 is coupled to an input of the optical spectrum analyzer. Transmission spectra were generated by physically rotating the panels in each port and recording the output. Maximum transmission occurred at about a 45° orientation, and minimal transmission occurred at about a 0° orientation, and one set of contrast ratio data was obtained by normalizing the former by the latter. One skilled in the art would readily understand that accurate absolute transmission of each band should not be extracted from the on-state data due to the tolerances of simultaneously coupling the three fields into the detector.

FIGS. 11, 12, 13 and 14 show measured output of the reflective optical in accordance with a preferred embodiment of the present invention, as measured by the optical spectrum analyzer. The measurements clearly demonstrate the notches in the yellow and cyan colors. On-axis contrast ratios are high throughout the visible spectrum, for example, greater than about 500:1.

The on-axis color gamut is far in excess of that required by the SMPTE standards, and the preferred embodiment combines color gamut and system brightness. Even greater increases in brightness are obtainable by sacrificing color coordinates. One preferred approach for increasing brightness is by increasing the transition slope of the first and second retarder stacks 160, 170, or by decreasing the notch density, by designing the first and second retarder stacks 160, 170 with greater transition band overlap while avoiding increased off-state leakage of inter-primary light.

Another preferred approach for increasing brightness is to use different retardation values for the first and second retarder stacks 160,170. Since the designs are not symmetric about the same wavelength, different notch densities can be obtained in the cyan and yellow. In some cases, adequate color coordinates can be obtained by completely avoiding a cyan notch, for example, by blocking 80%–90% of 578 nm light.

The density of the notch is determined by the difference in duty ratio, which here is measured as the relative width of the green notch between the first and second retarder stacks 160, 170 and the transition slope. In this example, both stacks include 14 layers of films adjacently stacked, giving a transition slope that discriminates between the green line (545 nm) and the yellow line (578 nm) of a light source 175. This approach thus provides a high degree of blocking in each notch.

Figure 11:
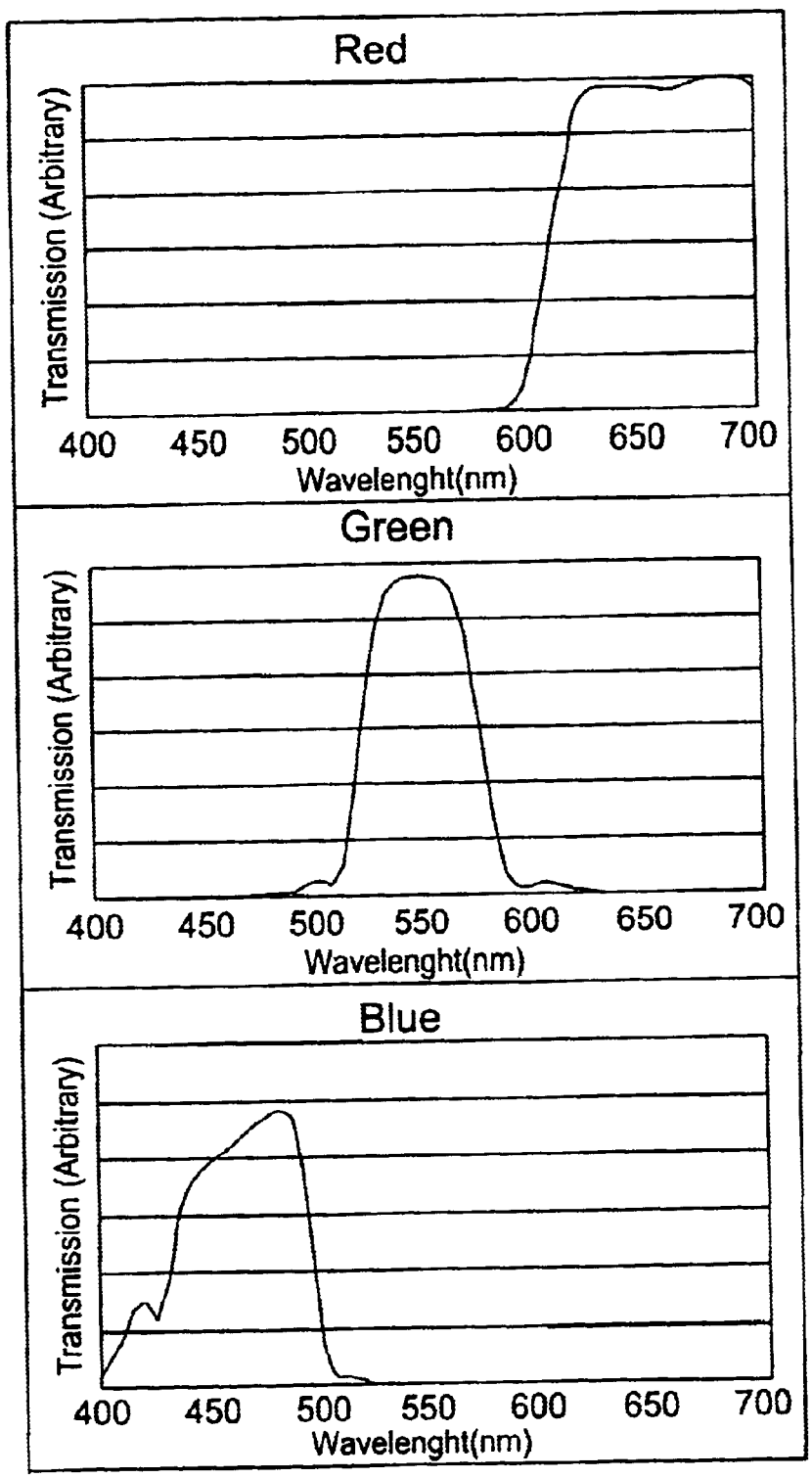
FIGS. 11, 12, 13 and 14 show measured output of the reflective display system of FIG. 5.
Figure 12:
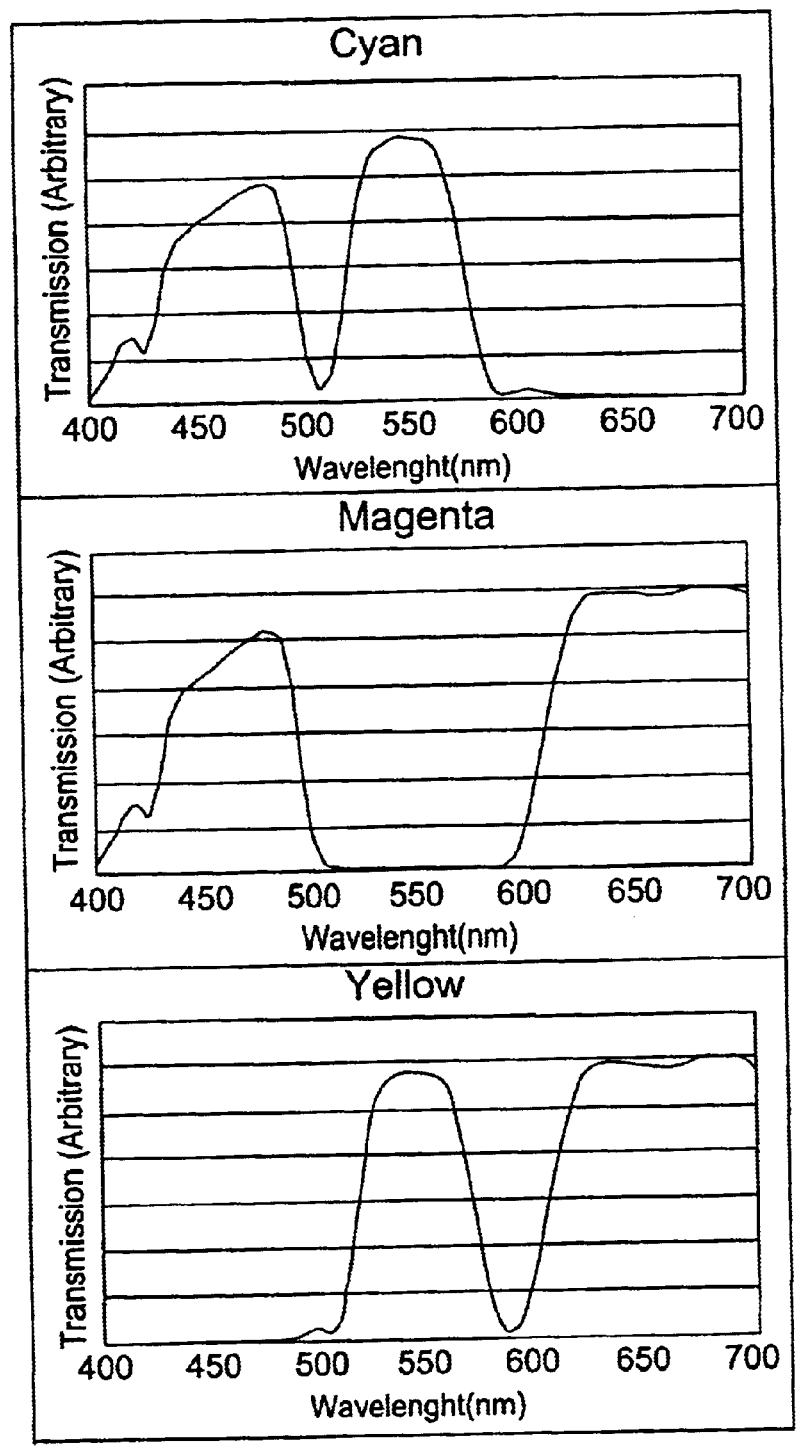
Figure 13:
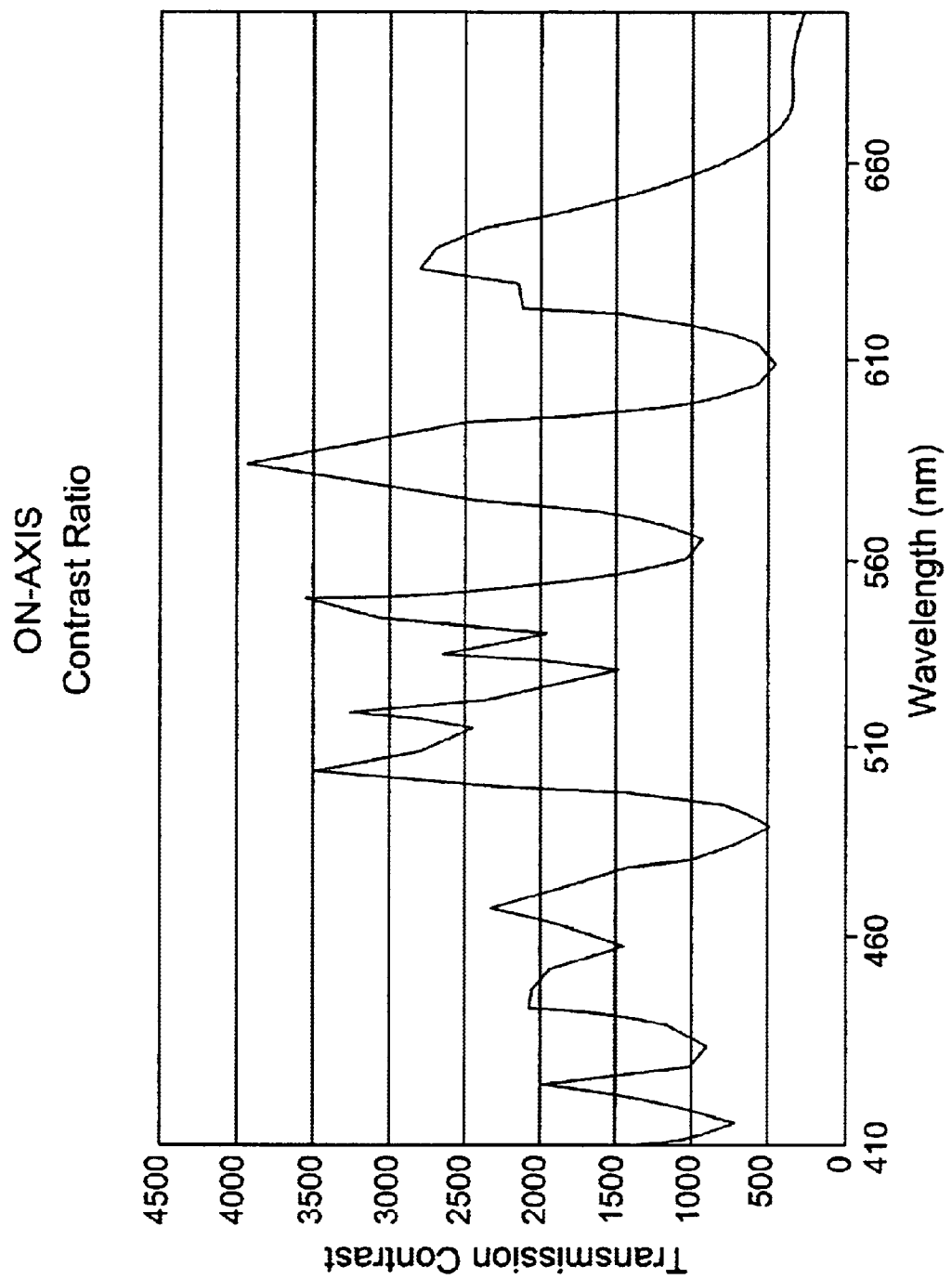
Figure 14:
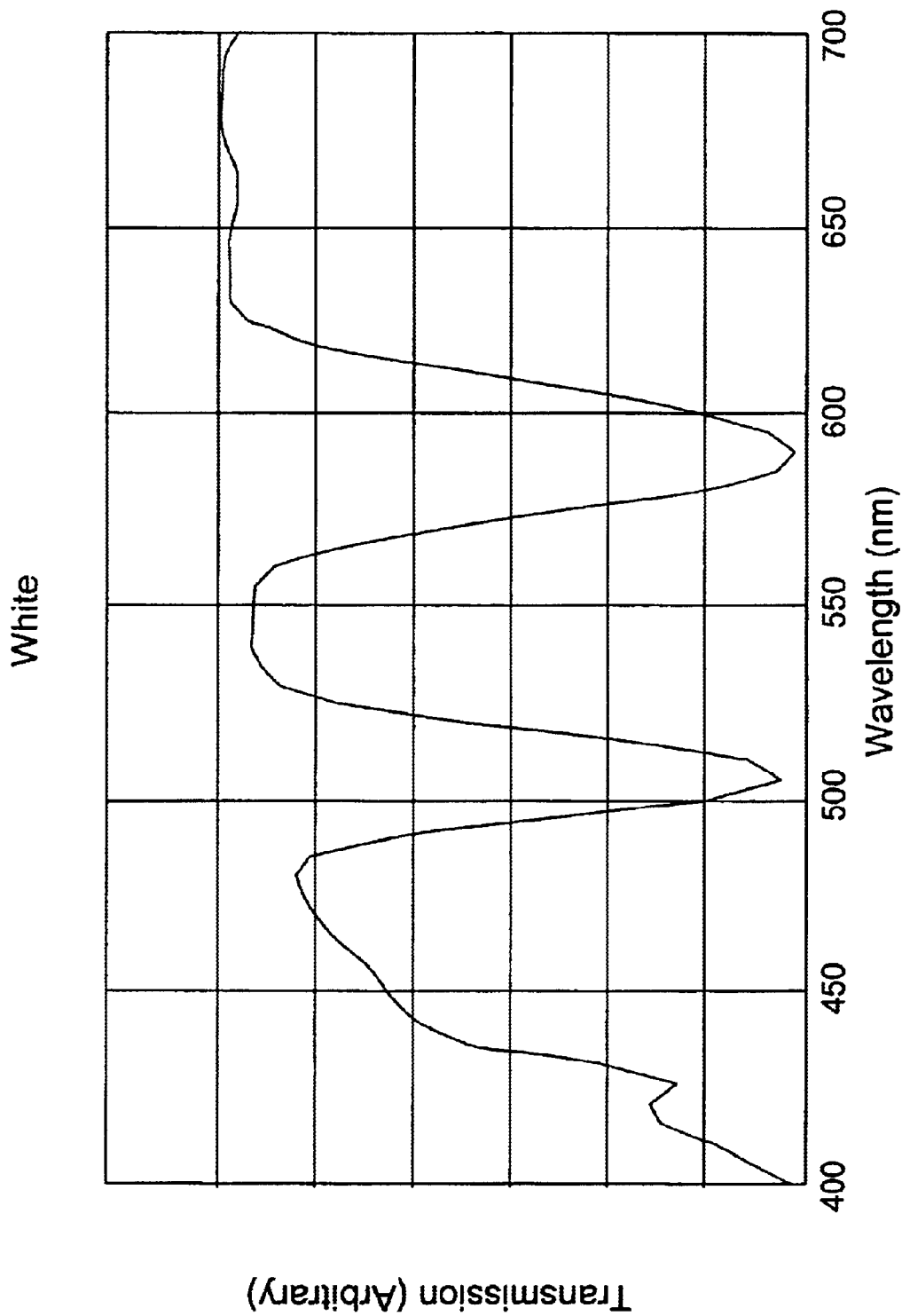

As shown in FIGS. 11 and 12, the first minimum of the green output of the first retarder stack 160 coincides with the first minimum of the magenta output of the second retarder stack 170, thereby providing dense blocking in the magenta notch. The magenta output of the second retarder stack 170 has 85% transmission at 491 nm, and 619 nm.

The preferred embodiments of the present invention provide an additional benefit of using retarder stack (RS) technology to create and combine color paths for reduced angle sensitivity. Related art color splitters, such as dichroic mirrors, cholesteric films, and holographic mirrors, create two physical paths, and determine the transition band characteristics. An RS 160,170 encodes color by polarization, and can thus determine the transition band characteristics, but a RS 160,170 does not physically separate the co-linearly propagating field components. As such, light is introduced substantially normal to the stack, thereby minimizing angle sensitivity. Therefore, if the optic axis of each film lies in-plane, the retardance shift for small excursions from normal incidence is a second order in angle. While the first (PBS) coatings used to create the color paths are substantially tilted (typically with a bias angle of 45°), the preferred embodiment provide neutral polarizing efficiency over the f-number of the systems. By separating the two functions, a significant decrease in angle sensitivity is provided.

Further decreases in angle sensitivity are achieved in the preferred embodiments by using specialized retardation films. A substantially insignificant angle insensitive retardation can be achieved using either a compound retarder, or a single biaxial retarder. For instance, a biaxial retardation film can be formed by stretching a polymer substrate both in-plane and along the film normal. When the retardation along the film normal is substantially half of the in-plane retardation, the wavelength shift with incidence angle becomes substantially insignificant.

For small excursions off-normal, the maximum retardation shift is fourth order in angle. Such films render spectral shifts of the half-power point insignificant. Table 2 shows measured data on the second retarder stack alone between parallel polarizers. Results show that the dominant spectral shifts are toward the red, with 0.5 nm maximum shift for a 15° half-cone angle. In such configurations, the first beamsplitter 110 (PBS) represents the limiting factor in color separation performance.

TABLE 2

Spectral shift of half-power point with angle of the second retarder stack 170 with 14 layers of 1.5-waves retardance at 545 nm. Four azimuth angles are given.

| Incidence Angle | Δλ (0) (nm) | Δλ (45°) (nm) | Δλ (−45°) (nm) | Δλ (90) (nm) |
|---|---|---|---|---|
| −30° | 1.88 | 0.68 | 0.26 | 2.06 |
| −25° | 1.16 | 0.32 | 0.14 | 1.34 |
| −20° | 0.68 | 0.14 | −0.04 | 0.92 |
| −15° | 0.32 | 0.14 | −0.10 | 0.50 |
| −10° | 0.20 | 0.02 | 0.02 | 0.20 |
| −5° | 0.02 | −0.10 | 0.08 | 0.08 |
| 5° | 0.0 | −0.04 | 0.02 | 0.20 |
| 10° | 0.02 | 0.08 | 0.08 | 0.20 |
| 15° | 0.26 | 0.08 | 0.14 | 0.32 |
| 20° | 0.70 | 0.20 | 0.32 | 0.80 |
| 25° | 1.28 | 0.32 | 0.32 | 1.28 |
| 30° | 1.88 | 0.38 | 0.50 | 1.94 |

Off-axis measurements of contrast ratio were made for green light using the assembly of FIG. 18 with the second beamsplitter 120 (dichroic mirror) removed. Quasi-collimated white light was filtered using a 550 nm bandpass with a 25 nm FWHM. Power was recorded using an optical power meter as a function of angle for P-rotations (in the plane containing the PBS coating normal) and for S-rotations. Contrast ratio was determined by normalizing the power measured with the green panel oriented at 45°, to that with the panel oriented at 0°. Results given in Table 3 show the desirable result that, while contrast ratio falls off with incidence angle, it remains high over reasonable f-numbers and the viewing cone is fairly isotropic.

TABLE 3

Contrast Ratio of Green Light Using Input/Output Retarder Stacks

| Incidence Angle | Contrast Ratio P-rot | Contrast Ratio S-rot |
|---|---|---|
| −16° | 133 | — |
| −14° | 191 | 258 |
| −12 | 247 | 272 |
| −10° | 292 | 336 |
| −8° | 376 | 454 |
| −6° | 541 | 602 |
| −4° | 895 | 1,072 |
| −2° | 1,438 | 1,825 |
| 0° | 2,037 | 2,034 |
| 2° | 2,299 | 1,775 |
| 4° | 2,359 | 1,576 |
| 6° | 2,097 | 1,133 |
| 8° | 1,024 | 882 |
| 10° | 559 | 656 |
| 12° | 440 | 301 |

TABLE 3-continued

Contrast Ratio of Green Light Using Input/Output Retarder Stacks

| Incidence Angle | Contrast Ratio P-rot | Contrast Ratio S-rot |
|---|---|---|
| 14° | 236 | 202 |
| 16° | 165 | — |

For comparison sake, a Philips prism was measured under the same conditions. Using the same procedure, contrast ratio of the green spectrum was measured as a function of orientation. While P-rotations resulted in acceptable contrast ratios, there was significant degradation in contrast ratio with S-rotations, as shown in Table 4.

TABLE 4

Contrast Ratio For Green Light Using Philips Prism for S-Rotations.

| Incidence Angle | Contrast Ratio (S-Rot) |
|---|---|
| −8° | 18.2 |
| −6° | 28.2 |
| −4° | 50.6 |
| −2° | 121.2 |
| 0° | 1,124.0 |
| 2° | 336.0 |
| 4° | 62.9 |
| 6° | 29.8 |
| 8° | 17.7 |

Figure 15:
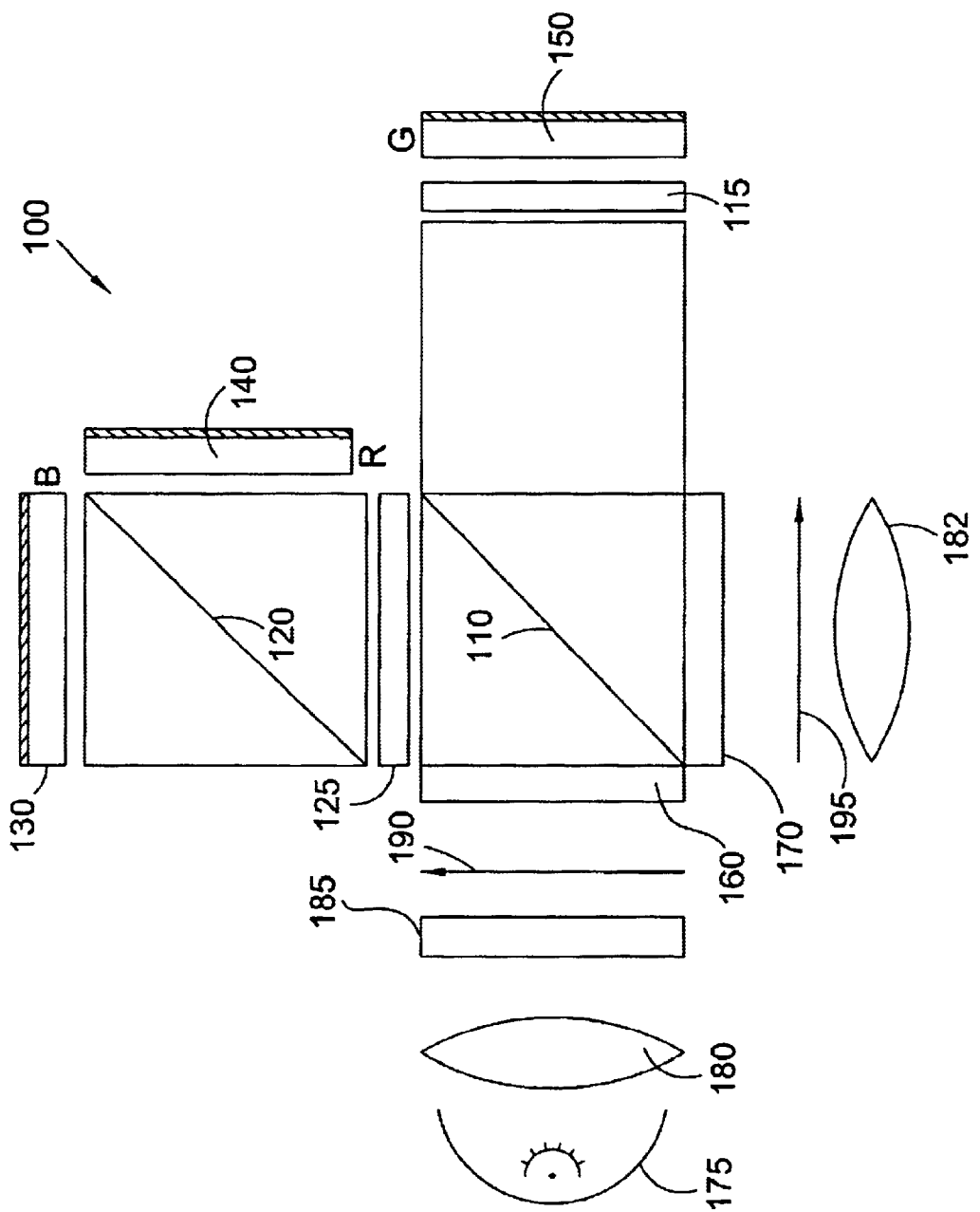
FIG. 15 illustrates a modification of the optical system shown in FIG. 4, in accordance with the present invention.

FIG. 15 illustrates a three panel reflective optical system 102 in accordance with still another preferred embodiment of the present invention. This preferred embodiment includes the features discussed above in relation to FIG. 4, and also includes a first and a second light doubler 115, 125 for increasing the intensity of the light, as it passes through the reflective optical system 102. The first and second light doublers 115, 125 are preferably inverters, which increase the intensity of the light for ferroelectric liquid crystal displays.

As shown in FIG. 15, white light from the light source 175 is polarized by the first cleanup polarizer 190 and is encoded by the first retarder stack 160 to align a first primary color along one polarization state and its complementary color along an orthogonal polarization state. The first primary color is transmitted by the first beamsplitter 110, and travels through a portion used to balance the optical paths of the separated beams. Then the first primary color is transmitted by the first light doubler 115, is spatially modulated by the third reflective modulator 150, and is transmitted back through the first light doubler 115. Next, the first primary color is reflected by the first beamsplitter 110, and exits the system through the second retarder stack 170, the second cleanup polarizer 195, and if needed, the second projection optics 182.

The complementary color of the first primary color is reflected by the first beamsplitter 110, and is split into the second and third primary colors after being transmitted by the second light doubler 125. The second primary color is then reflected by the color separator 120, is spatially modulated by the second reflective modulator 140, and is again reflected by the color separator 120 to be transmitted by the second light doubler 125. The third primary color is transmitted by the color separator 120, is spatially modulated by the first reflective modulator 130, and is again transmitted by the color separator 120. The second and third primary colors are combined and transmitted by the second light doubler 125, and the first beamsplitter 110 to exit the system 100 through the second retarder stack 170. The second retarder stack 170 transmits the combined complementary color and the first primary color having the same polarization state, through the second cleanup polarizer 195 and second projection optics 182.

To increase the contrast ratio, an intermediate retarder stack may be optionally positioned between the beamsplitter 110 and the color separator 120 in the embodiment of FIG. 4.

Figure 16:
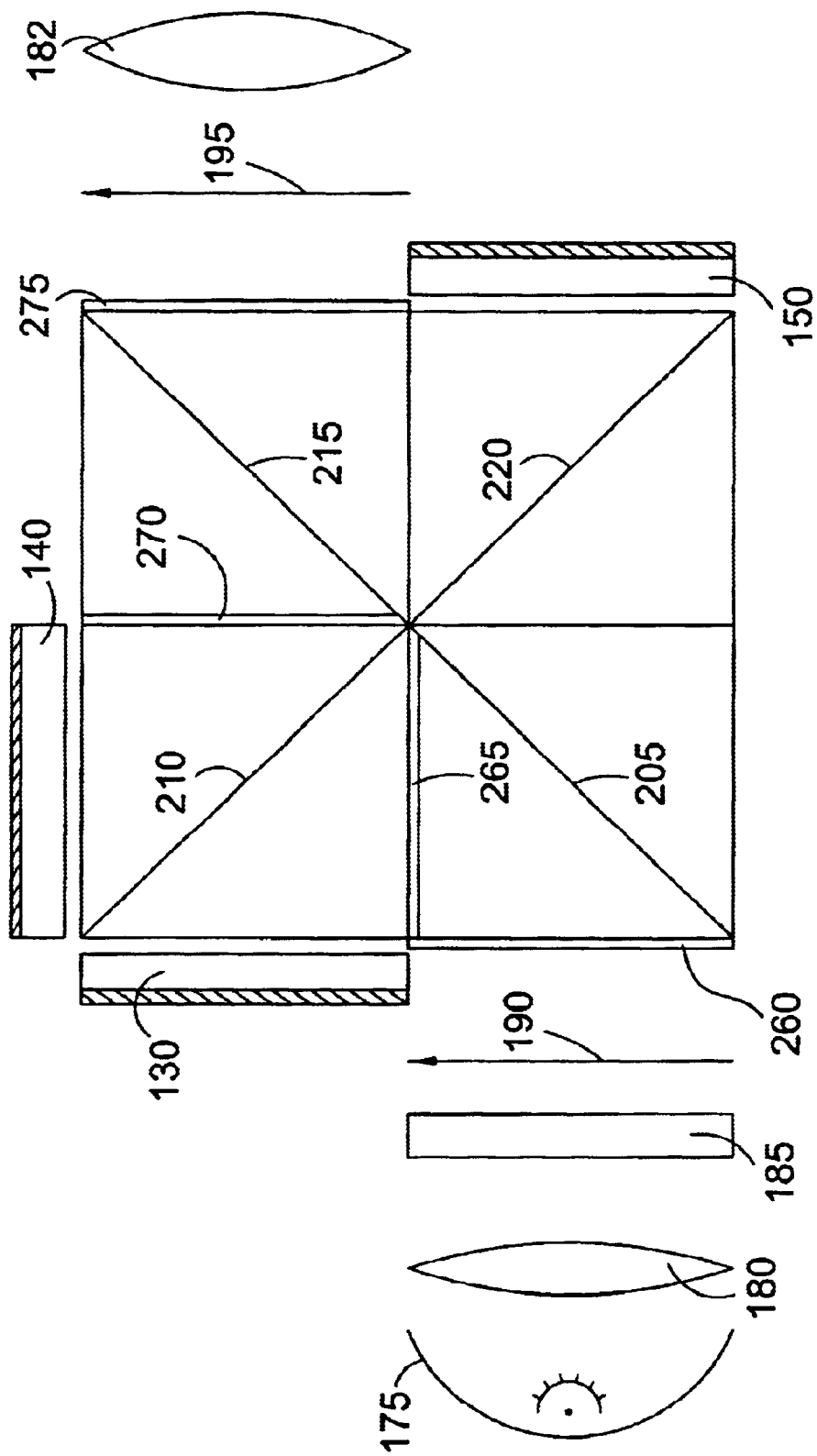
FIG. 16 illustrates an optical system including a three panel reflective display system, in accordance with another preferred embodiment of the present invention.

FIG. 16 illustrates an optical system 200 in accordance with yet still another preferred embodiment of the present invention, including first, second, third and fourth polarizing beamsplitters 205, 210, 215, 220; and first, second, third and fourth retarder stacks 260, 265, 270, 275. In this example, the first, second and third primary colors will be hereinafter referred to as blue, red and green, respectively. The colors are used for example purposes, as a skilled artisan would readily understand that the order of the colors can be changed as desired.

White light from a light source 175 is polarized by the first retarder stack 260 such that blue light is polarized along one polarization state and its complementary color, yellow light is polarized to an orthogonal polarization state. The first polarized beamsplitter (PBS) 520 transmits blue and reflects yellow. The second retarder stack 265, which is a red/cyan or a green/magenta retarder stack, encodes red to one polarization state and green to the orthogonal state. The first and second reflective modulators 130, 140 modulate red and green light, respectively. The second PBS 210 then transmits the red light and reflects the green light. The third retarder stack 270 recombines the red and green light into one polarization state that is transmitted by the third PBS 215 through the fourth retarder stack 275.

The fourth PBS 220 transmits the blue light from the first PBS 205 to the third reflective modulator 150, which modulates and reflects the blue light back to the fourth PBS 220. The fourth PBS 220 reflects the blue light to the third PBS 215, which reflects the blue light to the fourth retarder stack 275. The fourth retarder stack 270 rotates all three primary colors, red, green and blue into the same polarization state and outputs the combined spectrum.

The color splitting and combining structure and methods of the preferred embodiments of the present application creates separate color paths using stack retardation films and neutral polarization splitters. It is for use in reflective split-path projectors and applies in particular to reflective liquid crystal on silicon displays. Retarder stack (RS) technology is used to provide separation of color via polarization. When combined with structures that create physically distinct paths from orthogonal polarizations, color splitting is accomplished. Retarder stacks generate flat passband and stopband profiles, narrow transition bandwidths, and low color cross-talk. Unlike related dichroic beamsplitters, RS technology is based on polarization. This allows a merging of color and polarization management in projectors which is integral to the compact architectures described herein.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, a skilled artesian would readily understand that the second beamsplitter 120 could act upon either the light reflected by the first beamsplitter 100, or the light transmitted by the first beamsplitter. In the claims, means-plus-function clauses are intended to cover the structures described herein as performing the recited function and not only structural equivalents but also equivalent structures.

What is claimed is:

1. An optical system, comprising:
    an input retarder stack that transforms a first spectrum of input light from a light source into a first polarization state, and transforms a second spectrum of the input light into a second polarization state different than the first polarization state;
    a beam splitting unit, optically coupled to the input retarder stack, comprising a first beamsplitter that transmits the first polarization state and reflects the second polarization state;
    a first spatial light modulator optically coupled to the beam splitting unit, that modulates and reflects the first spectrum, as a modulated first spectrum, towards the beam splitting unit; and
    a second spatial light modulator optically coupled to the beam splitting unit, that modulates and reflects the second spectrum, as a modulated second spectrum, towards the beam splitting unit,
    wherein the beam splitting unit combines the modulated first spectrum and the modulated second spectrum into a combined spectrum.

2. The optical system of claim 1, wherein the second polarization state is orthogonal to the first polarization state.

3. The optical system of claim 1, wherein the first spectrum and the second spectrum are selected from at least one of blue light, red light and green light.

4. The optical system of claim 1, further comprising an input polarizer, optically coupled to the input retarder stack, that polarizes and transmits the input light towards the first retarder stack.

5. The optical system of claim 1, further comprising a polarization conversion array, optically coupled to the input retarder stack, that converts a polarization of the input light into an input polarization state.

6. The optical system of claim 1, further comprising an input lens positioned between the input retarder stack and the light source.

7. The optical system of claim 1, wherein the light source is selected from an incandescent lamp, a laser, a light-emitting diode, an ultra-high pressure mercury lamp, a metal halide lamp, and a fusion lamp.

8. The optical system of claim 1, further comprising an output retarder stack, optically coupled to the beam splitting unit, that transforms a polarization of the combined spectrum into a substantially single polarization state.

9. The optical system of claim 8, wherein the output retarder stack has a transition band that does not overlap a transition band of the input retarder stack.

10. The optical system of claim 8, wherein a separation of half power point s of the input retarder stack and the output retarder stack is between approximately 5 nm and 40 nm.

11. The optical system of claim 8, further comprising an output polarizer, optically coupled to the output retarder stack.

12. The optical system of claim 8, further comprising an output lens, optically coupled to the output retarder stack, that receives and transmits the combined spectrum.

13. The optical system of claim 1 further comprising optical projection optics optically communicating with the combined spectrum to form an optical projector.

14. A method for producing a modulated color image comprising:
- encoding a first primary color from a white light source along a first polarization state while encoding its complimentary color along a second polarization state;
- directing light having the first polarization state to a first spatial light modulator for modulation with image data for the first primary color to yield a modulated first primary color;
- directing light having the second polarization state to a color separator for separating the complementary color into a second primary color and a third primary color;
- directing the second primary color to a second spatial light modulator for modulation with image data for a second primary color to yield a modulated second primary color;
- directing the third primary color to a third spatial light modulator for modulation with image data for a third primary color to yield a modulated third primary color;
- recombining the modulated first, second, and third primary colors such that the first, second, and third modulated primary colors have substantially the same polarization state.

15. An optical system for producing a modulated color image comprising:
- an optical element for encoding a first primary color from a white light source along a first polarization state while encoding its complimentary color along a second polarization state;
- a first polarization beamsplitter for directing light having the first polarization state in a first direction to a first spatial light modulator for modulation with image data for the first primary color to yield a modulated first primary color, while directing light having the second polarization state in a second direction different from the first direction;
- a color separator for receiving the complementary color and separating the complementary color into a second primary color and a third primary color and directing the second primary color to a second spatial light modulator for modulation with image data for a second primary color to yield a modulated second primary color, and directing the third primary color to a third spatial light modulator for modulation with image data for a third primary color to yield a modulated third primary color;
- means for recombining the modulated first, second, and third primary colors such that the first, second, and third modulated primary colors have the substantially the same polarization state.

16. An optical system, comprising:
- an input retarder stack comprising at least two polymer retarder films that transforms a first spectrum of input light from a light source into a first polarization state, and transforms a second spectrum of the input light into a second polarization state different than the first polarization state; and
- a beam splitting unit, optically coupled to the input retarder stack, comprising a first beamsplitter that transmits the first spectrum and reflects the second spectrum.

17. An optical system, comprising:
- an input retarder stack comprising at least two thin films that transforms a first spectrum of input light from a light source into a first polarization state, and transforms a second spectrum of the input light into a second polarization state different than the first polarization state; and
- a beam splitting unit, optically coupled to the input retarder stack, comprising a first beamsplitter that transmits the first spectrum and reflects the second spectrum.

18. An optical system, comprising:
- an input retarder stack comprising between two and seven retarder films that transforms a first spectrum of input light from a light source into a first polarization state, and transforms a second spectrum of the input light into a second polarization state different than the first polarization state; and
- a beam splitting unit, optically coupled to the input retarder stack, comprising a first beamsplitter that transmits the first spectrum and reflects the second spectrum.

19. An optical system, comprising:
- an input retarder stack comprising between eight and twenty retarder films that transforms a first spectrum of input light from a light source into a first polarization state, and transforms a second spectrum of the input light into a second polarization state different than the first polarization state; and
- a beam splitting unit, optically coupled to the input retarder stack, comprising a first beamsplitter that transmits the first spectrum and reflects the second spectrum.

20. An optical system, comprising:
- an input retarder stack that transforms a first spectrum of input light from a light source into a first polarization state, and transforms a second spectrum of the input light into a second polarization state different than the first polarization state; and
- a beam splitting unit, optically coupled to the input retarder stack, comprising a first beamsplitter that transmits the first spectrum and reflects the second spectrum; and
- a second beamsplitter that receives the second spectrum, transmits a predetermined portion of the second spectrum as a third spectrum, and reflects a remaining portion of the second spectrum as a fourth spectrum.

21. The optical system of claim 20, further comprising:
- a first spatial light modulator optically coupled to the beam splitting unit, that alters and reflects the fist spectrum, as a modulated first spectrum, towards the beam splitting unit;
- a second spatial light modulator optically coupled to the beam splitting unit, that alters and reflects the third spectrum, as a modulated third spectrum, towards the beam splitting unit; and
- a third spatial light modulator optically coupled to the beam splitting unit, that alters and reflects the fourth spectrum, as a modulated fourth spectrum, towards the beams splitting unit,
- wherein the beam splitting unit combines the modulated first, second, third and fourth spectra into a combined spectrum.

22. The optical system of claim 21, wherein the first, second and third spatial light modulators alter light in accordance with color image information related to the respective spectrum.

23. The optical system of claim 22, wherein the first, second and third spatial light modulators are liquid crystal modulators.

24. The optical system of claim 20, wherein the first beamsplitter comprises a polarizing beamsplitter that transmits and reflects light based on polarization.

25. The optical system of claim 24, wherein the second beamsplitter comprises a dichroic beamsplitter that transmits light within a first predetermined wavelength band and reflects light within a second predetermined wavelength band.

26. The optical system of claim 25, further comprising:
a first light doubler positioned between the first beam splitting unit and the second beamsplitter; and
a second light doubler positioned between the first beam splitting unit and the first spatial light modulator.

27. The optical system of claim 20 further comprising:
a first intermediate retarder optically coupled between the beam splitting unit and the second beamsplitter, such that the first intermediate retarder aligns the third spectrum along a third polarization state and aligns the fourth spectrum along a fourth polarization state different than the third polarization state; and
wherein the second beamsplitter is a polarizing beamsplitter.

28. The optical system of claim 27 further comprising:
a third beamsplitter, optically coupled between a first spatial light modulator and the first beam splitting unit, that reflects a first modulated transmitted spectrum, and
a fourth beamsplitter, optically coupled between the third beamsplitter and the second beamsplitter, that combines the first, third, and fourth modulated spectra.

29. The optical system of claim 28, further comprising:
a second intermediate retarder optically coupled between the second beamsplitter, and the fourth beamsplitter.

30. The optical system of claim 29 further comprising an output retarder optically coupled to the fourth beamsplitter.

31. The optical system of claim 20 further comprising:
a first spatial light modulator optically coupled to the beam splitting unit for modulating the first spectrum;
a second spatial light modulator optically coupled to the second beamsplitter for modulating the third spectrum; and
a third spatial light modulator optically coupled to the second beamsplitter for modulating the fourth spectrum.

32. The optical system of claim 31 further comprising:
a first light doublet optically coupled between the first beam splitting unit and the second beamsplitter that increases the intensity of the third spectrum and the fourth spectrum; and
a second light doublet optically coupled between the first beam splitting unit and the first spatial light modulator that increases the intensity of the first spectrum.

33. An optical system, comprising:
an input retarder stack that transforms a first spectrum of input light from a light source into a first polarization state, and transforms a second spectrum of the input light into a second polarization state different than the first polarization state; and
a beam splitting unit, optically coupled to the input retarder stack, comprising a first beamsplitter that transmits the first spectrum and reflects the second spectrum, wherein at least one of the first spectrum and second spectrum are complementary color spectra.

34. The optical system of claim 33 wherein the at least one band of wavelengths has a full-width-half-maximum value of at least 70 nm.

35. The optical system of claim 33 wherein the at least one band of wavelengths has a full-width-half-maximum of at least 97 nm.

36. The optical system of claim 33 wherein the at least one band of wavelengths define a color.

37. The optical system of claim 36 wherein the color comprises an additive primary color.

38. The optical system of claim 36 wherein the color comprises a subtractive primary color.

39. The optical system of claim 36 wherein the color comprises a substantially saturated color.

40. An optical system, comprising:
an input retarder stack that transforms a first spectrum of input light from a light source into a first polarization state, and transforms a second spectrum of the input light into a second polarization state different than the first polarization state; and
a beam splitting unit, optically coupled to the input retarder stack, comprising a first beamsplitter that transmits the first spectrum and reflects the second spectrum, wherein the first and second spectra arc complementary color spectra, and wherein at least one of the first spectrum and the second spectrum is an approximate square wave.

41. The optical system of claim 40, wherein the approximate square wave includes more than one transmission maximum within a pass-band, and more than one transmission minimum within a stop-band.

42. The optical system of claim 40, wherein a transition band slope of the approximate square wave is less than 40 nm.

43. The optical system of claim 40, wherein a transition band slope of the approximate square wave is less than 25 nm.

* * * * *